United States Patent
Tseng et al.

(10) Patent No.: US 9,573,307 B1
(45) Date of Patent: Feb. 21, 2017

(54) METHOD FOR PREPARING A FIBER-REINFORCED COMPOSITE ARTICLE BY USING COMPUTER-AIDED ENGINEERING

(71) Applicant: CORETECH SYSTEM CO., LTD., Chupei, Hsinchu County (TW)

(72) Inventors: Huan Chang Tseng, Chupei (TW); Chia Hsiang Hsu, Chupei (TW); Rong Yeu Chang, Chupei (TW)

(73) Assignee: CORETECH SYSTEM CO., LTD., Chupei, Hsinchu County (TW)

( * ) Notice: Subject to any disclaimer, the term of this patent is extended or adjusted under 35 U.S.C. 154(b) by 0 days.

(21) Appl. No.: 15/013,787

(22) Filed: Feb. 2, 2016

(51) Int. Cl.
| | |
|---|---|
| B29C 45/76 | (2006.01) |
| B29C 45/00 | (2006.01) |
| B29K 105/12 | (2006.01) |
| B29K 105/14 | (2006.01) |

(52) U.S. Cl.
CPC ....... *B29C 45/7693* (2013.01); *B29C 45/0005* (2013.01); *B29C 2045/0006* (2013.01); *B29C 2945/76976* (2013.01); *B29K 2105/12* (2013.01); *B29K 2105/14* (2013.01); *B29K 2995/0077* (2013.01)

(58) Field of Classification Search
CPC .................. B29C 45/7693; B29C 45/0005
See application file for complete search history.

(56) References Cited

U.S. PATENT DOCUMENTS 8,571,828 B2  10/2013  Tseng et al.

OTHER PUBLICATIONS

J. Wang, Improved Fiber Orientation Predictions for Injection Molded Composites, University of Illinois at Urbana-Champaign (2007).
J. H. Phelps, Processing-Microstructure Models for Short- and Long-Fiber Thermoplastic Composites, University of Illinois at Urbana-Champaign (2009).
H.-C. Tseng, R.-Y. Chang, and C.-H. Hsu, Phenomenological Improvements to Predictive Models of Fiber Orientation in Concentrated Suspensions, J. Rheol. 57, 1597 (2013).
H. M. Laun, Orientation Effects and Rheology of Short Glass Fiber-Reinforced Thermoplastics, Colloid. Polym. Sci. 262, 257 (1984).

(Continued)

*Primary Examiner* — Matthew Daniels
(74) *Attorney, Agent, or Firm* — Muncy, Geissler, Olds & Lowe, P.C.

(57) ABSTRACT

A method for preparing a fiber-reinforced composite article initially performs a trial molding by a molding machine to prepare a trial composite article of a composite molding material including a polymeric material having a plurality of fibers, wherein the trial composite article has a trial fiber orientation distribution. The method further generates a predicted fiber orientation distribution fitting with the trial fiber orientation distribution, wherein the predicted fiber orientation distribution is generated by performing a first molding simulation for the trial composite article by using physical rheology parameters and physical fiber orientation parameters. The method further performs a second molding simulation for a real composite article by using the physical rheology parameters and the physical fiber orientation parameters to obtain molding conditions for the molding machine, and performs a real molding process by the molding machine by using the molding conditions to prepare the real composite article.

8 Claims, 17 Drawing Sheets

(56) References Cited

OTHER PUBLICATIONS

Bay RS, Tucker III CL. Fiber orientation in simple injection moldings. Part i: Theory and numerical methods. Polymer Composites 1992;13:317-331.

Bay RS, Tucker III CL. Fiber orientation in simple injection moldings. Part ii: Experimental results. Polymer Composites 1992;13:332.

Huynh HM. Improved fiber orientation predictions for injection molded composites. Master's Thesis, University of Illinois at Urbana-Champaign; 2001.

Papanastasiou TC. Flows of materials with yield. J Rheol 1987;31:385.

Advani SG. Flow and rheology in polymer composites manufacturing. New York: Elsevier; 1994.

Chang R-Y, Yang W-H. Numerical simulation of mold filling in injection molding using a three-dimensional finite volume approach. Int J Numer Methods Fluids 2001;37:125.

Richeton J, Ahzi S, Vecchio KS, Jiang FC, Adharapurapu RR. Influence of temperature and strain rate on the mechanical behavior of three amorphous polymers: Characterization and modeling of the compressive yield stress. International Journal of Solids and Structures 2006;43:2318-2335.

Foss PH, Tseng H-C, Snawerdt J, Chang Y-J, Yang W-H, Hsu C-H. Prediction of fiber orientation distribution in injection molded parts using moldex3d simulation. Polymer Composites 2014;35:671-680.

Darlington MW, Smith AC. Some features of the injection molding of short fiber reinforced thermoplastics in center sprue-gated cavities. Polymer Composites 1987;8:16-21.

Umesh Gandhi et al. Method to measure orientation of discontinuous fiber embedded in the polymer matrix from computerized tomography scan data, Journal of Thermoplastic Composite Materials, pp. 1-14, 2015.

METHOD FOR PREPARING A FIBER-REINFORCED COMPOSITE ARTICLE BY USING COMPUTER-AIDED ENGINEERING

TECHNICAL FIELD

The present disclosure relates to a method for preparing a fiber-reinforced composite article and a method for measuring physical parameters of a composite molding material by using a computer-aided engineering (CAE) simulation.

DISCUSSION OF THE BACKGROUND

Higher fuel consumption standards are driving the progress and applications of automotive light-weight materials. Among them, fiber-reinforced thermoplastic (FRT) composites are favored due to excellent strength/weight properties. It is important to understand the fiber reinforcement microstructure.

FIG. 1 shows an FRT composite article with a fan-gated plaque geometry having a marked region C at the center, and FIG. 2 shows a well-known skin-shell-core structure found in an experimental flow-direction orientation component across the thickness of the molded FRT article along the thickness direction at the region C shown in FIG. 1. One of the important orientation descriptors is the flow direction orientation component ($A_{11}$) corresponding to the flow direction, referring to the degree of orientation of fibers along the flow direction. In general, a high value of the flow direction orientation component ($A_{11}$) would indicate a great deal of fibers laying in the flow direction Those fibers found in the shell region (near the cavity wall with high shear rates) are strongly aligned in the flow direction, but the other fibers in the core region (near the cavity center with low shear rates) are transverse to the flow direction. The skin region indicates a decrease of fiber alignment since the fibers at the front is influenced by fountain flow and rapidly frozen close to the cold mold. In order to manufacture safer FRT products with higher strength, a trend to use higher fiber concentration or longer fiber length is recently attempted in automotive, aerospace and energy industries. In particular, a great core-width feature is found in such a condition. Unfortunately, the conventional fiber orientation simulation technique cannot predict such core width, because it predicts a much thinner core region as compared to the experimental orientation data.

To solve this shortage, Huynh proposed one possible mechanism in his master's thesis (Huynh H M. Improved fiber orientation predictions for injection molded composites. Master's Thesis, University of Illinois at Urbana-Champaign; 2001). In Huynh's work, a Yield-WLF-Cross viscosity model was produced by combining the standard WLF-Cross model and the Papanastasiou model (Papanastasiou T C. Flows of materials with yield. J Rheol 1987; 31:385). Furthermore, the Yield-WLF-Cross viscosity model was then implemented into an ORIENT program to predict the fiber orientation, wherein the ORIENT program uses a finite difference scheme based on the Hele-Shaw approximation and the Folgar-Tucker orientation equation (Bay R S, Tucker III C L. Fiber orientation in simple injection moldings. Part i: Theory and numerical methods. Polymer Composites 1992; 13:317-331 and Bay R S, Tucker III C L. Fiber orientation in simple injection moldings. Part ii: Experimental results. Polymer Composites 1992; 13:332).

FIG. 3 shows viscosity versus shear rate for WLF-Cross and Yield-WLF-Cross viscosity models according to the prior art (disclosed in Huynh's work). It appears that the Yield-WLF-Cross model involves two regions: the low-shear-rate yield stress region and the high-shear-rate shear thinning region, without an obvious Newtonian plateau, differing from the standard WLF-Cross model. In addition, the yield-stress viscosity at two different temperatures is the same; namely, the temperature-independent yield-stress viscosity is constant. However, in the real world, the yield-stress viscosity is different at different temperatures; in other words, the Huynh's work does not match the experimental data.

FIG. 4 shows the predicted flow direction orientation component ($A_{11}$) with respect to the normalized thickness (z/h), using different viscosity models according to the prior art (disclosed in Huynh's work). The standard WLF-Cross viscosity model predicts a very narrow core as compared with the experimental data. The core region is widened by applying the Yield-WLF-Cross viscosity model; however, Huynh's work shows a flat orientation plateau/well over a core region, which does not match the experimental data. In conclusion, a yield stress does not provide adequate improvement to the orientation predictions.

In particular, over the last three decades, great effort has been made to describe the flow-induced variation of fiber orientation in fiber suspension rheology. The injection molding software has adopted several theoretical approaches, including the Folgar-Tucker IRD (Isotropic Rotary Diffusion) model, the Phelps-Tucker ARD (Anisotropic Rotary Diffusion) model, and the Wang-Tucker RSC (Reduced Strain Closure) model (Wang J. Improved fiber orientation predictions for injection molded composites. Ph.D. Thesis, University of Illinois at Urbana-Champaign; 2007 and Phelps J H. Processing-microstructure models for short-fiber and long-fiber thermoplastic composites. Ph.D. Thesis, University of Illinois at Urbana-Champaign; 2009). Recently, Tseng et al. developed a fiber orientation model called the iARD-RPR model (Improved Anisotropic Rotary Diffusion model combined with Retarding Principal Rate model, Tseng H-C, Chang R-Y, Hsu C-H. Method and computer readable media for determining orientation of fibers in a fluid. U.S. Pat. No. 8,571,828; 2013 and Tseng H-C, Chang R-Y, Hsu C-H. Phenomenological improvements to predictive models of fiber orientation in concentrated suspensions. J Rheol 2013; 57:1597-1631).

However, using these conventional models, the predicted fiber core width is too narrow or not broad enough, as shown in FIG. 2. So far, the underlying cause of the inaccurate prediction of the core width is not clear to the orientation prediction area. More importantly, the anisotropic orientation prediction strongly influences the warpage and structure analyses of a final molded FRT article.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides a method for preparing a fiber-reinforced composite article, comprising steps of performing a trial molding by a molding machine to prepare a trial composite article of a composite molding material including a polymeric material having a plurality of fibers, wherein the trial composite article has a trial fiber orientation distribution; generating a predicted fiber orientation distribution fitting with the trial fiber orientation distribution, wherein the predicted fiber orientation distribution is generated by performing a first molding simulation for the trial composite article of the composite molding material by using physical rheology parameters and physical fiber orientation parameters; performing a second molding simulation for a real composite article of the composite molding material by using the physical rheology parameters and the physical fiber orientation parameters to obtain molding conditions for the molding machine; and performing a real molding process by the molding machine by using the molding conditions to prepare the real composite article.

In accordance with some embodiments of the present disclosure, the physical rheology parameters include yield stress parameters of the composite molding material.

In accordance with some embodiments of the present disclosure, the physical fiber orientation parameters include an orientation parameter representing a fiber-fiber interaction, a fiber-matrix interaction, or an orientation-to-random process of the fibers.

In accordance with some embodiments of the present disclosure, the trial fiber orientation distribution has a trial core width, a trial shell height, and a trial skin thickness, and the generating of a predicted fiber orientation distribution fitting with the trial fiber orientation distribution comprises steps of performing the first molding simulation to generate a simulating fiber orientation distribution for the trial composite article of the composite molding material injected into a mold by using simulating rheology parameters and simulating fiber orientation parameters of the composite molding material; checking if a predicted core width of the simulating fiber orientation distribution fits with the trial core width, wherein if not affirmative, the simulating rheology parameters are updated and the first molding simulation is repeated; checking if a predicted shell height and a predicted skin thickness of the simulating fiber orientation distribution fit with the trial shell height and the trial skin thickness, wherein if not affirmative, the simulating fiber orientation parameters are updated and the first molding simulation is repeated; and if affirmative, the predicted fiber orientation distribution is set as the simulating fiber orientation distribution, and the physical rheology parameters and physical fiber orientation parameters are set as the simulating rheology parameters and simulating fiber orientation parameters of the composite molding material.

In accordance with some embodiments of the present disclosure, the trial core width of the trial composite article is correlated with the physical rheology parameters, and the trial shell height and the trial skin thickness are correlated with the physical fiber orientation parameters.

In accordance with some embodiments of the present disclosure, the first molding simulation is performed without assuming a steady state flow on simulating a molding phenomenon of the composite molding material.

In accordance with some embodiments of the present disclosure, the first molding simulation is performed without assuming a simple velocity gradient on simulating a molding phenomenon of the composite molding material.

In accordance with some embodiments of the present disclosure, the real composite article has a first geometry, and the trial composite article has a second geometry that is simpler than the first geometry.

In accordance with some embodiments of the present disclosure, the predicted fiber orientation distribution represents an orientation of the plurality of fibers along a flow direction of the composite molding material.

Another aspect of the present disclosure provides a method for measuring physical parameters of a composite molding material, comprising steps of performing a trial molding by a molding machine to prepare a trial composite article of a composite molding material including a polymeric material having a plurality of fibers, wherein the trial composite article has a trial fiber orientation distribution having a trial core width; generating a predicted fiber orientation distribution fitting with the trial fiber orientation distribution, wherein the predicted fiber orientation distribution is generated by performing a molding simulation for the trial composite article of the composite molding material, and the predicted fiber orientation distribution has a predicted core width; and determining physical rheology parameters when taking into consideration the trial core width and the predicted core width.

In accordance with some embodiments of the present disclosure, the physical rheology parameters include yield stress parameters of the composite molding material.

In accordance with some embodiments of the present disclosure, the generating of a predicted fiber orientation distribution fitting with the trial fiber orientation distribution comprises steps of setting simulating rheology parameters and simulating fiber orientation parameters for the composite molding material; performing the molding simulation to generate a simulating fiber orientation distribution for the trial composite article of the composite molding material injected into a mold on the molding machine; checking if the predicted core width of the simulating fiber orientation distribution fits with the trial core width, wherein if not affirmative, the simulating rheology parameters are updated and the molding simulation is repeated; and if affirmative, the predicted fiber orientation distribution is set as the simulating fiber orientation distribution, and the physical rheology parameters are set as the simulating rheology parameters.

In accordance with some embodiments of the present disclosure, the trial core width of the trial composite article is correlated with the physical rheology parameters.

In accordance with some embodiments of the present disclosure, the molding simulation is performed without assuming a steady state flow on simulating a molding phenomenon of the composite molding material.

In accordance with some embodiments of the present disclosure, the molding simulation is performed without assuming a simple velocity gradient on simulating a molding phenomenon of the composite molding material.

In accordance with some embodiments of the present disclosure, the trial composite article has a center-gated disk geometry, a fan-gated plaque geometry or an end-gated plaque geometry.

In accordance with some embodiments of the present disclosure, the predicted fiber orientation distribution represents an orientation of the plurality of fibers along a flow direction of the composite molding material.

Another aspect of the present disclosure provides a method for measuring physical parameters of a composite molding material, comprising steps of performing a trial molding by a molding machine to prepare a trial composite article of a composite molding material including a polymeric material having a plurality of fibers, wherein the trial composite article has a trial fiber orientation distribution having a trial shell height and a trial skin thickness; generating a predicted fiber orientation distribution fitting with the trial fiber orientation distribution, wherein the predicted fiber orientation distribution is generated by performing a molding simulation for the trial composite article of the composite molding material, and the predicted fiber orientation distribution has a predicted shell height and a predicted skin thickness; and determining physical fiber orientation parameters of the composite molding material when taking into consideration the trial shell height and a trial skin thickness and the predicted shell height and the predicted skin thickness.

In accordance with some embodiments of the present disclosure, the physical fiber orientation parameters include an orientation parameter representing a fiber-fiber interaction, a fiber-matrix interaction, or an orientation-to-random process of the fibers.

In accordance with some embodiments of the present disclosure, the generating of a predicted fiber orientation distribution fitting with the trial fiber orientation distribution comprises steps of setting simulating fiber orientation parameters for the composite molding material; performing the molding simulation to generate a simulating fiber orientation distribution for the trial composite article of the composite molding material injected into a mold on the molding machine; checking if the predicted shell height and the predicted skin thickness of the simulating fiber orientation distribution fit with the trial shell height and the trial skin thickness, wherein if not affirmative, the simulating fiber orientation parameters are updated and the molding simulation is repeated; and if affirmative, the predicted fiber orientation distribution is set as the simulating fiber orientation distribution, and the physical fiber orientation distribution parameters are set as the simulating fiber orientation distribution parameters.

In accordance with some embodiments of the present disclosure, the trial shell height and the trial skin thickness are correlated with the physical fiber orientation parameters.

In accordance with some embodiments of the present disclosure, the molding simulation is performed without assuming a steady state flow on simulating a molding phenomenon of the composite molding material.

In accordance with some embodiments of the present disclosure, the molding simulation is performed without assuming a simple velocity gradient on simulating a molding phenomenon of the composite molding material.

In accordance with some embodiments of the present disclosure, the trial composite article has a center-gated disk geometry, a fan-gated plaque geometry or an end-gated plaque geometry.

In accordance with some embodiments of the present disclosure, the predicted fiber orientation distribution represents an orientation of the plurality of fibers along a flow direction of the composite molding material.

The mechanical property of the molding product is correlated with the orientation distribution of the fibers; for example, the elastic modulus is strongly dependent on the fiber orientation. If the simulated orientation distribution of the fibers with the corresponding mechanical property does not meet the specification of the molding composite article, the fiber parameters and/or molding conditions may be adjusted, and another CAE molding simulation is performed to obtain an updated orientation distribution of the fibers while using the adjusted fiber parameters and/or molding condition, wherein the fiber parameters include the concentration of the fibers in the fluid, the fiber aspect ratio, and the shape factor; and the molding conditions include the resin filling rate, metal mold temperature, and the melting resin temperature.

One aspect of the present disclosure is to predict a broad core region by a modified Yield-WLF-Cross viscosity model. A commercial injection molding simulation software, Moldex3D Solid Model (copyrighted by CoreTech System, Inc., Taiwan), is based on the true solid three-dimensional Finite Volume Method (3D-FVM) technology, which accurately simulates the transient flow field in a complex three-dimensional geometry due to its robustness and efficiency. The iARD-RPR fiber orientation model has been demonstrated as an available model for predicting short/long fiber orientation. Among the modified Yield-WLF-Cross model, the Arrhenius-Eyring equation is incorporated to express the temperature-dependent yield stress, and is combined with the Yield-WLF-Cross model. Therefore, the Moldex3D computational platform uses an iARD-RPR model and modified Yield-WLF-Cross model to predict fiber orientation distribution in an injection molding of a fiber-reinforced composite article with simple plaque geometry. Consequently, the core region is sufficiently widened with a smooth parabolic orientation well, which is more reasonable than Huynh's work. It appears that this result matches the experimental data. For fiber orientation prediction, it is critical that the Moldex3D provides accurate shear rates averaged by nine components of velocity-gradient tensor and uses reliable yield-stress viscosity, and that the objective iARD-RPR model yields an anisotropic fiber orientation.

In some embodiment of the present disclosure, two rheology parameters Arrhenius-Eyring of yield stress ($\tau_{y0}$ and $E_r$) and three iARD-RPR parameters of fiber orientation ($C_I$, $C_M$ and $\alpha$) are used to predict evolution of flow filed and fiber orientation. In some embodiment of the present disclosure, the Moldex3D is used as a computational platform for exemplary, simple geometric injection molding, including end-gated strips and center-gated disks. These parameters are correlated with the predicted fiber orientation distribution, and changing the values of these parameters can correspondingly change the predicted fiber orientation distributions. The present disclosure checks if the predicted fiber orientation distribution fits with the experimental fiber orientation distribution; if not affirmative, the values of these parameters are updated to correspondingly change the predicted fiber orientation distribution, which is then compared with experimental fiber orientation distributions until the predicted fiber orientation distribution fits with the experimental fiber orientation distribution; if affirmative, these updated parameters corresponds to the physical parameters of the fiber-reinforced composite material. Thus, one objective of this disclosure is that the matched physical parameters are applied to the preparation of a real fiber-reinforced composite article with a complex 3-D geometry by injection molding.

Conventionally, the rheology parameters, such as the yield stress of the fiber-reinforced composite material, are measured by both a rotational viscometer and capillary viscometer; however, it is very difficult for these meters to measure the rheology parameters at the low-shear-rate yield stress viscosity and at low temperatures, due to low repeatability of the data. Instead of directly measuring these parameters of the fiber-reinforced molding material to be used in preparing the real composite article with a complex geometry, the present disclosure measures the fiber orientation distribution (core width, shell height, skin thickness) of the trial composite article having a simple geometry, and performs the CAE molding simulation capable of predicting the fiber orientation distribution, and then compares the measured fiber orientation distribution with the predicted fiber orientation distribution so as to obtain the rheology parameters of the fiber-reinforced molding material to be used to prepare the real composite article having a relatively complex geometry.

Conventionally, it is very difficult to measure the fiber orientation parameters (fiber-fiber interaction, fiber-matrix interaction, and orientation-to-random process of the fibers) of the fiber-reinforced composite material. In some embodiments, the present disclosure measures the fiber orientation distribution (core width, shell height, skin thickness) of the trial composite article having a simple geometry, and performs the CAE molding simulation capable of predicting the fiber orientation distribution, and then compares the measured fiber orientation distribution with the predicted fiber orientation distribution so as to obtain the fiber orientation parameters of the fiber-reinforced molding material.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a method for preparing a fiber-reinforced composite article and a method for measuring physical parameters of a composite molding material. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 5:
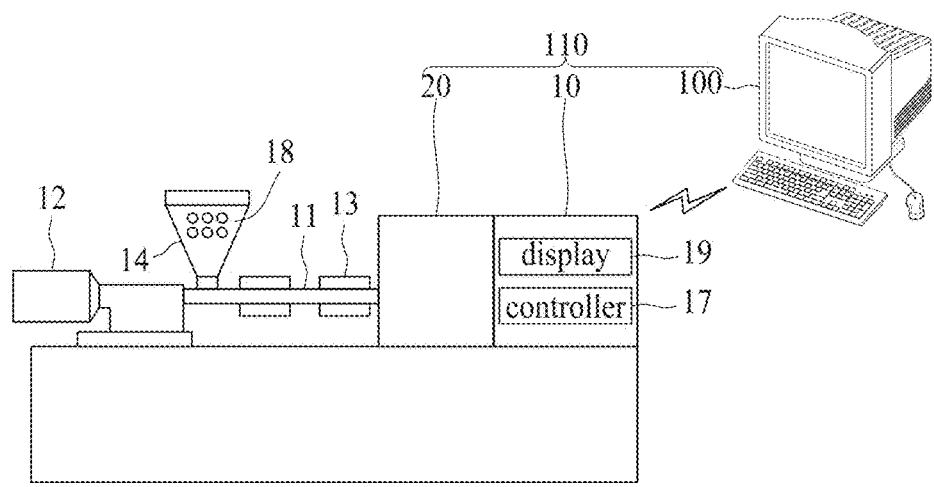
FIG. 5 and FIG. 6 are schematic views of a molding system in accordance with various embodiments of the present disclosure.
Figure 6:
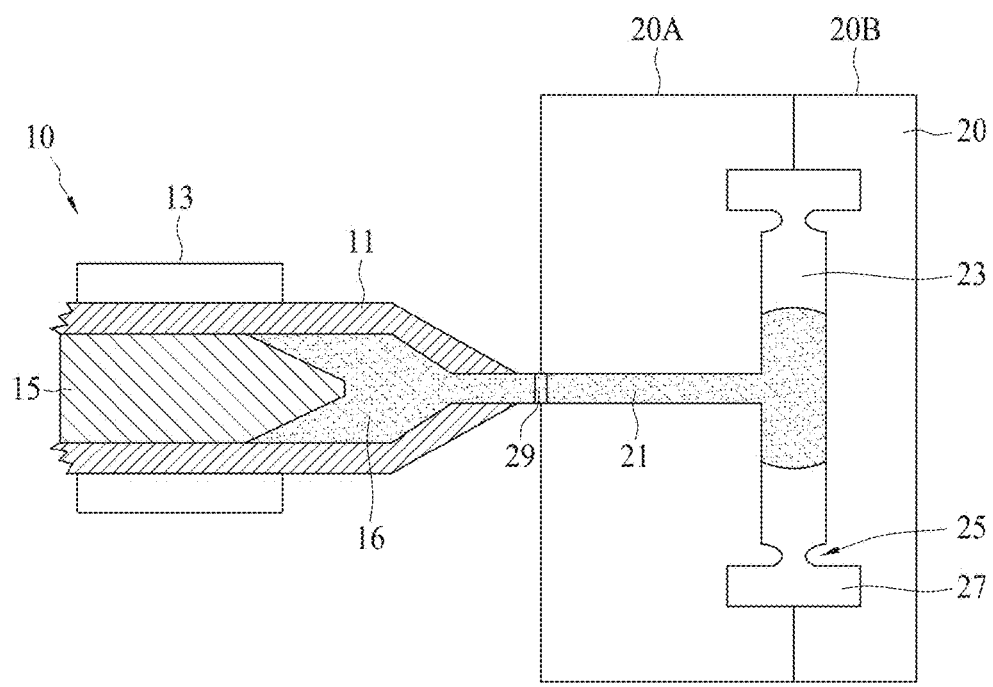

FIG. 5 and FIG. 6 are schematic views of a molding system 110 in accordance with various embodiments of the present disclosure. In some embodiments, the molding system 110 comprises a molding machine 10, such as an injection molding machine, and a mold 20 disposed on the molding machine 10. In some embodiments, the molding system 110 further comprises a computer 100 operably coupled to the molding machine 10. In some embodiments, the molding machine 10 includes a screw chamber 11, heating elements 13 configured to heat the screw chamber 11, a hopper 14 having composite pellets 17, and a screw 15 positioned in the screw chamber 11 and driven by a screw-driving device 12 for feeding a molding material 16 into a mold cavity 25 of the metal mold 20 via a nozzle 29.

In some embodiments, the molding machine 10 has a controller 17 configured to control the operation of the molding machine 10 and a display 19 configured to display information of the molding process. In some embodiments, the computer 100 is configured to execute CAE simulation software and transmit the simulation result, such as the molding condition, to the controller 17 through a connection therebetween, such as a hard wire connection or a wireless coupling. In some embodiment, the screw-driving device 12 includes an electric motor, a hydraulic actuator, or a combination thereof; in addition, the screw-driving device 12 is configured in response to control signals from the controller 20 to rotate the screw 15 and move the screw 15 toward the nozzle 29 so as to transfer the molding material 16 into the sprue portion 21 of the metal mold 20.

In some embodiments, the metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the molding machine 10. The sprue portion 21 of the metal mold 20 is connected to the barrel 11 of the molding machine 10 via the nozzle 29. In some embodiments, and the hopper 14 is configured to direct the composite pellets 17 to the screw chamber 11, where the composite pellets 17 are melted and transformed into the molding material 16.

Figure 7:
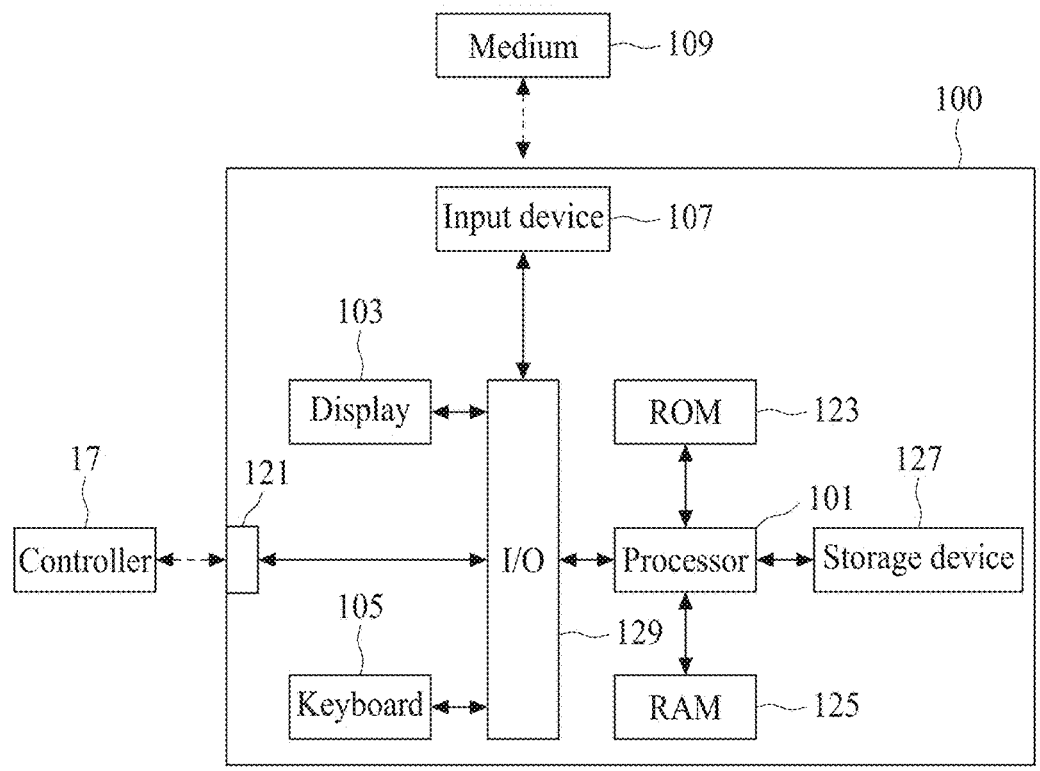
FIG. 7 is a functional block diagram of the computer in FIG. 5 in accordance with various embodiments of the present disclosure.

FIG. 7 is a functional block diagram of the computer 100 in FIG. 5. In some embodiments, the computer 100 comprises a computer processor 101 for performing a computer-implemented simulation method for use in a molding. In some embodiments, the computer 100 includes a read-only memory (ROM) 123, a random access memory (RAM) 125, a storage device 127, an input/output (I/O) interface 129, and a communication port 121 associated with the controller 17 of the injection machine 10. The computer processor 101 operably communicates with the ROM 123, the RAM 125, the storage device 127, and the I/O interface 129.

In some embodiments, the computer 100 may further include a display 103, a keyboard 105, and an input device 107 such as a card reader or an optical disk drive. The input device 107 is configured to input computer instructions (software algorithms) stored in a non-transitory computer-readable medium 130, and the computer processor 101 is configured to execute operations for performing a computer-implemented molding simulation method according to the computer instructions. The computer processor 101 reads software algorithms from the input device 107 or the storage device 127, executes the calculation steps, and stores the calculated result in the RAM 125.

In some embodiments, the composite pellets 17 include polymeric material having a plurality of fibers therein. In some embodiments, the composite pellets 17 are made of FRT composites, which are grouped into two categories based on fiber length: short fiber-reinforced thermoplastics (SFRTs) with a fiber length of about 0.2 to 0.4 mm, and long fiber-reinforced thermoplastics (LFRTs) having a fiber length of about 10 to 13 mm. LFRTs can yield continuous-fiber reinforcement. LFRT pellets are more extensively employed in automotive industrial fabrication than SFRT pellets.

The injection molding technique uses conventional rapid automated molding equipment, and SFRT/LFRT production has been applied using the injection molding process. In the injection molding process, the additional fiber composites filled in melted polymer/resin (polymeric matrix) are transported as a suspension into the mold cavity 25. To design molding composite products effectively, the influence of flow-induced fiber orientation distribution on the mechanical properties, such as the strength of the finished molding composite product, must be considered.

Figure 8:
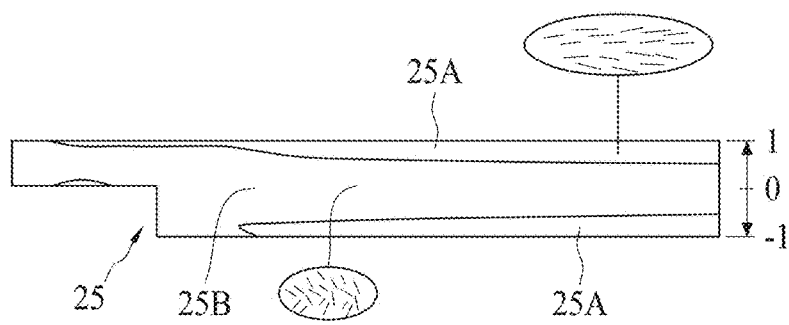
FIG. 8 illustrates the orientation of the fibers filled into the mold cavity having an end-gated plaque geometry in accordance with various embodiments of the present disclosure.

FIG. 8 illustrates the orientation of the fibers filled into the mold cavity 25 having an end-gated plaque geometry. The most noticeable feature of the filling is the existence of a shell region 25A and a core region 25B across the thickness of the molded cavity 25. The fibers found in the shell region 25A (near the cavity wall) are strongly aligned in the flow direction, but the fibers in the core region 25B (near the cavity center) are transverse to the flow. Hence, it is necessary to understand how the fiber orientation varies during the mold filling.

An accuracy of fiber orientation prediction for an injection molded fiber reinforced composite article is strongly related to the numerical flow field calculation, the objective fiber orientation model and the realistic viscosity model. Previous research had been performed to improve fiber orientation prediction with a narrow core in Huynh's work; the means involved the Hele-Shaw approximation, the Folgar-Tucker orientation equation, and the Yield-WLF-Cross viscosity model with a constant temperature-independent yield-stress. Unfortunately, Huynh's ultimate result failed due to a non-physical flat orientation plateau.

Figure 2:
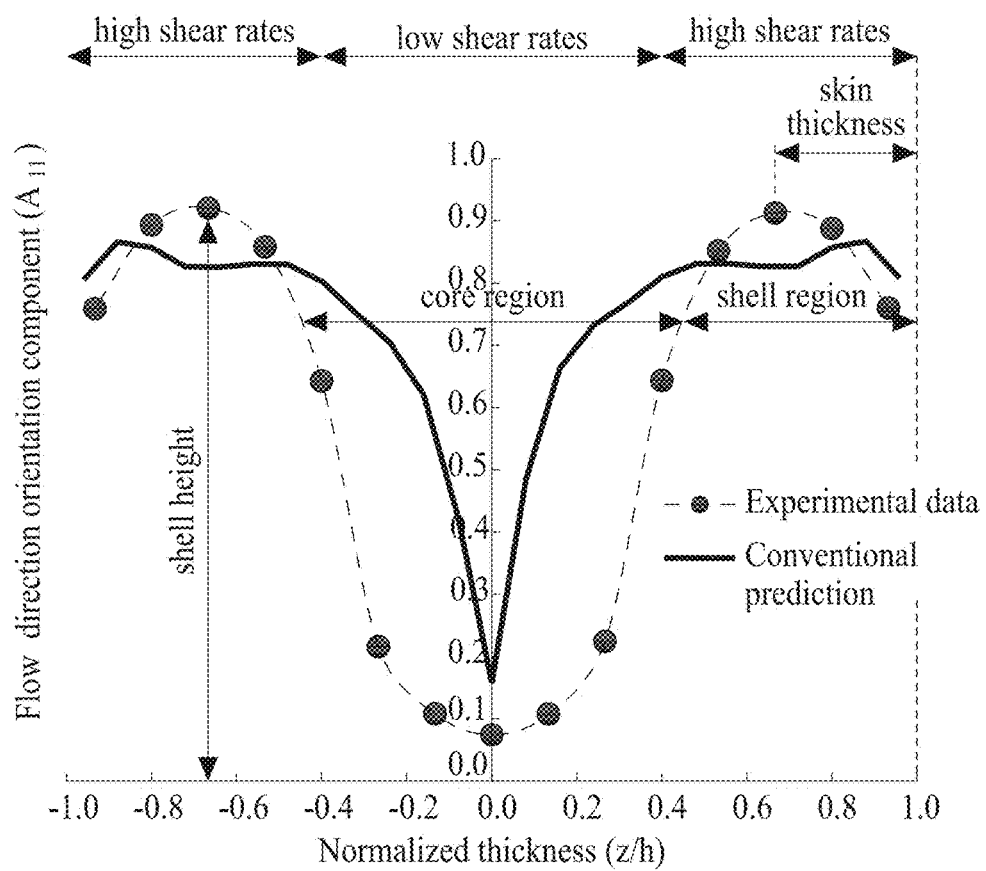
FIG. 2 shows a well-known shell-core structure found in an experimental flow-direction orientation component across the thickness of the molded FRT article along the thickness direction at the region C shown in FIG. 1 according to the prior art.
Figure 3:
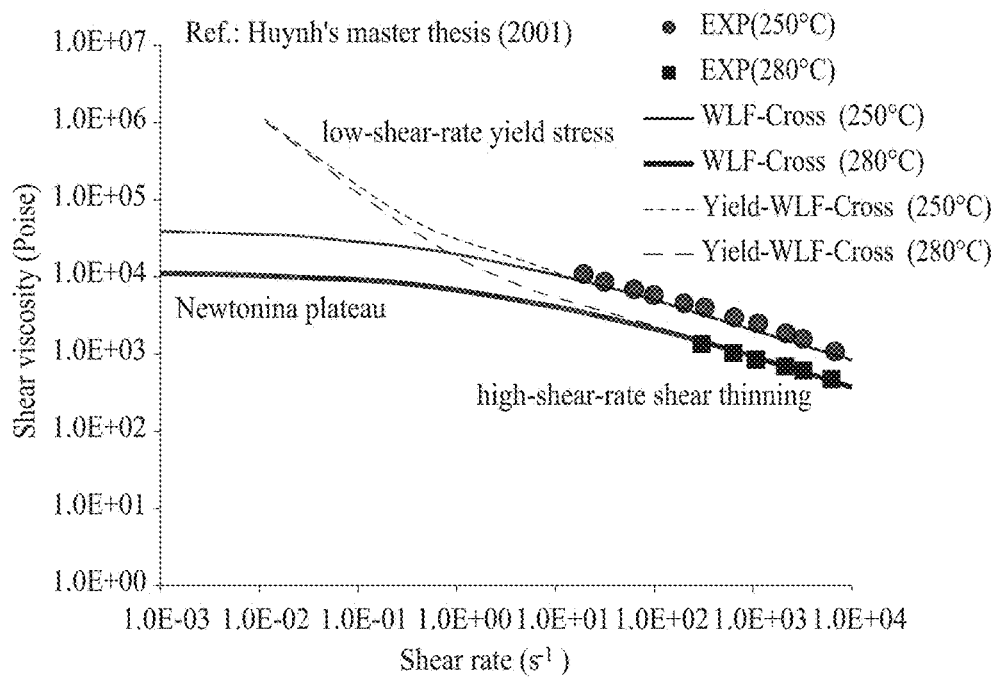
FIG. 3 shows viscosity versus shear rate for WLF-Cross and Yield-WLF-Cross viscosity models according to the prior art.

As shown in FIG. 2, using these conventional models, the core width of the conventional prediction method is too narrow or not broad enough with respect to the experiment data. To investigate the underlying cause of the inaccurate prediction of the core width of the conventional prediction method, the present disclosure uses a commercial injection molding simulation software, Moldex3D Shell Model (copyrighted by CoreTech System, Inc., Taiwan), which is based on the Hele-Shaw approximation and the Folgar-Tucker orientation equation, to perform the fiber orientation prediction in an injection molding simulation with a filling rate of 142 cc/sec. The temperatures of the metal mold 20 and the melting molding material 16 are set at 85° C. and 290° C., respectively.

Figure 9:
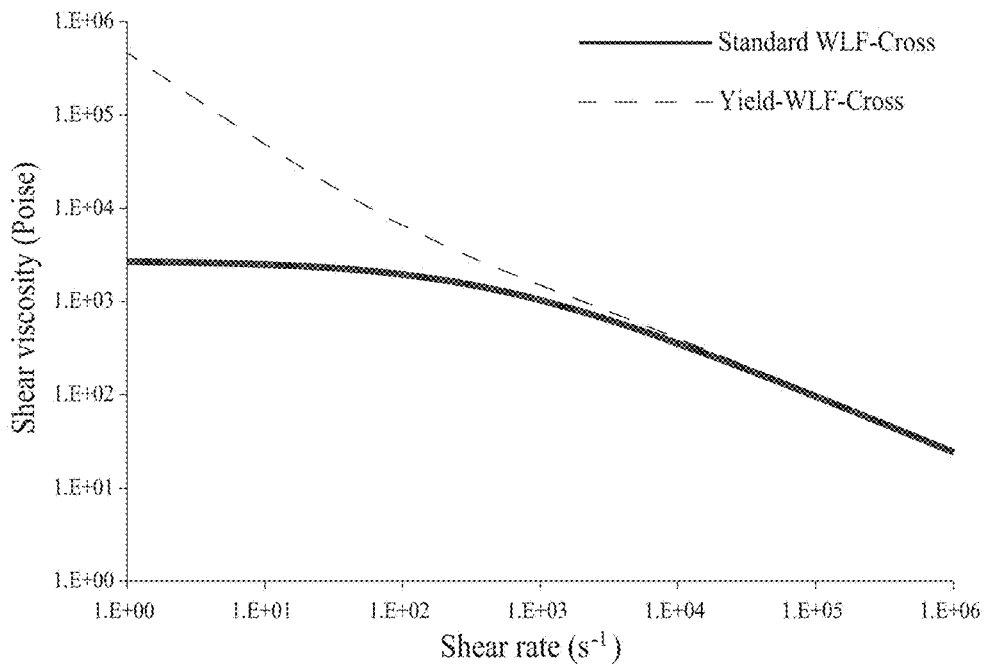
FIG. 9 shows the variation of the shear viscosity ($\eta$) of the molding material with respect to the shear rate in accordance with various embodiments of the present disclosure.

FIG. 9 shows the variation of the shear viscosity ($\eta$) of the molding material with respect to the shear rate. The standard WLF-Cross viscosity model and the Yield-WLF-Cross viscosity model for 30% wt short-glass Polybutylene terephthalate (herein referred to as "30% GF/PBT") are illustrated in FIG. 9. At low shear rates, the Yield-WLF-Cross model has a yield-stress viscosity slope, whereas the standard WLF-Cross model has a Newtonian viscosity plateau.

Figure 10:
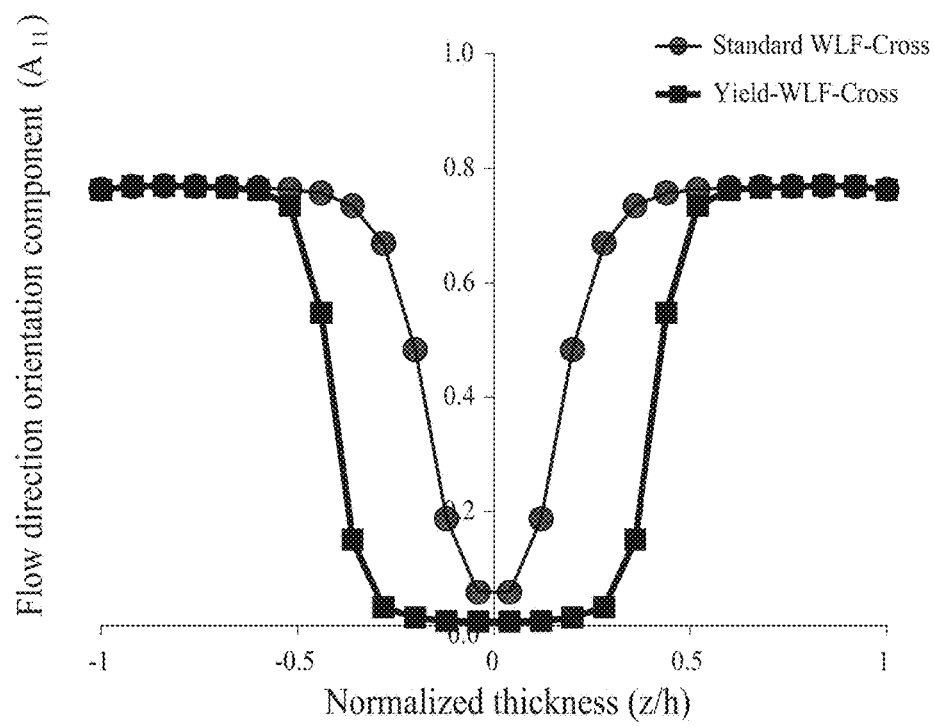
FIG. 10 shows the predicted flow direction orientation component ($A_{11}$) of the molding material with respect to the normalized thickness (z/h) at region C of the fan-gated plaque (FIG. 1) for the 30% GF/PBT, using different viscosity models in accordance with various embodiments of the present disclosure.

FIG. 10 shows the predicted flow direction orientation component ($A_{11}$) of the molding material with respect to the normalized thickness (z/h) at region C of the fan-gated plaque (FIG. 1) for the 30% GF/PBT, using different viscosity models. As shown in FIG. 10, the Yield-WLF-Cross model clearly shows a non-physical flat orientation plateau, or a well over a core region and a broad core region; in contrast, the standard WLF-Cross model shows a relatively narrower core region.

In some embodiments, referring back to the experimental data in FIG. 2, the core width of the core region can be set as the normalized thickness between the two inflection points of the alignment curve, where the shell height can be set as the highest value of the orientation component ($A_{11}$) of the alignment curve, and the skin thickness can be set as the normalized thickness from the surface to the highest value of the orientation component ($A_{11}$) of the alignment curve. In some embodiments, the core width, the shell height, and the skin thickness may be defined by ways other than these above.

Figure 11:
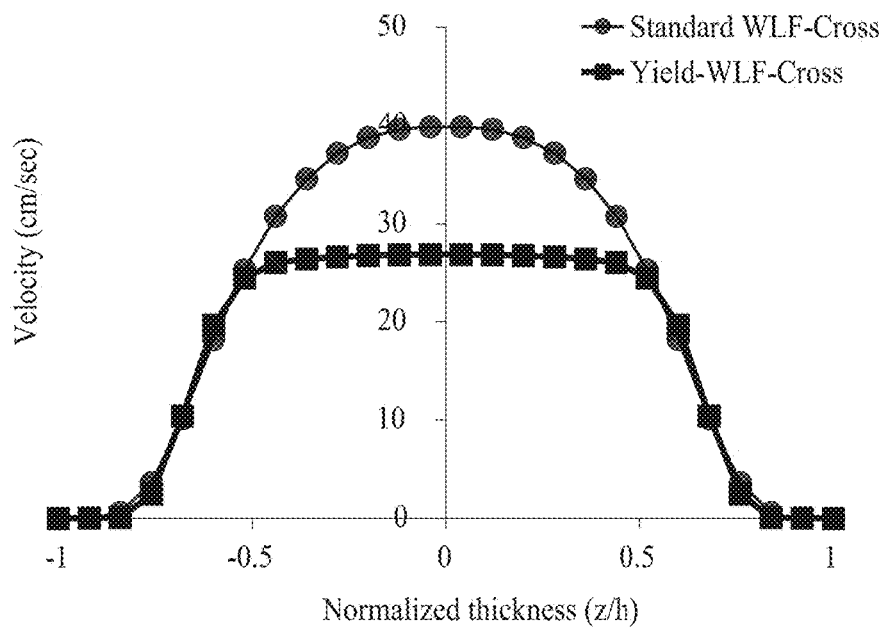
FIG. 11 shows the predicted velocity profiles of the molding material with respect to the normalized thickness (z/h) at region C of the fan-gated plaque (FIG. 1) for the 30% GF/PBT, using different viscosity models in accordance with various embodiments of the present disclosure.
Figure 12:
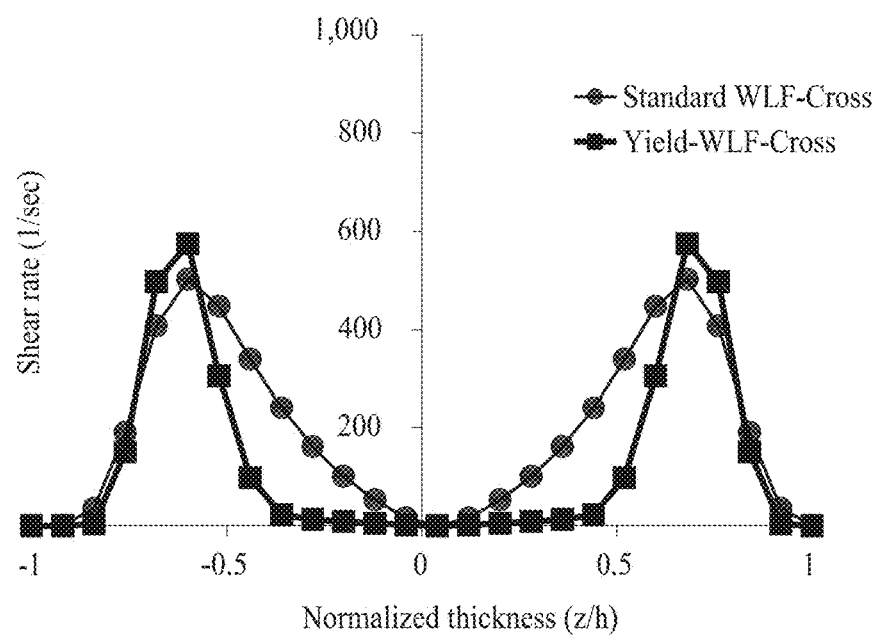
FIG. 12 shows the predicted shear rate profiles of the molding material with respect to the normalized thickness (z/h) at region C of the fan-gated plaque (FIG. 1) for the 30% GF/PBT, using different viscosity models in accordance with various embodiments of the present disclosure.

FIG. 11 shows the predicted velocity profiles of the molding material with respect to the normalized thickness (z/h) at region C of the fan-gated plaque (FIG. 1) for the 30% GF/PBT, using different viscosity models, and FIG. 12 shows the predicted shear rate profiles of the molding material with respect to the normalized thickness (z/h) at region C of the fan-gated plaque (FIG. 1) for the 30% GF/PBT, using different viscosity models. The standard WLF-Cross model has both parabolic velocity and shear rate profiles, whereas the Yield-WLF-Cross model has an obvious plug flow profile (flat plateau profile). In particular, the shear rate of the Yield-WLF-Cross model is close to zero over the core region in FIG. 12, and the orientation component ($A_{11}$) of the Yield-WLF-Cross model over the core region correspondingly becomes a non-physical flat plateau in FIG. 10. Therefore, it appears that a zero shear rate at the core region in FIG. 12 may be the underlying cause of the non-physical flat plateau over the core region in FIG. 10.

Basically, the fiber orientation is strongly influenced by the flow field, while the flow behavior depends on the fluid viscosity. Flow-induced fiber orientation distribution presents a shell-core structure as shown in FIG. 2. Referring to FIG. 8, those fibers found in the shell region 25A are strongly aligned with the flow direction over a high-shear-rate range, as opposed to the other fibers found in the core region 25B near the cavity center are transverse to the flow over a low-shear-rate range. The orientation is indirectly related to the viscosity. Thus, such a broader core region should be related to a low-shear-rate shear viscosity. In conclusion, we believe there to be an accurate causal linkage: the orientation distribution depends on the flow field in the mold and the flow field further depends on the shear viscosity of the molding composite material. Therefore, the present disclosure proposes a reliable viscosity model integrally combined with a true solid three-dimensional CAE molding simulation tool to implement an objective orientation prediction, as describe in detail below.

The molding phenomena of the molding material 16 can be simulated by using the following governing equations (1)-(4):

$$\frac{\partial \rho}{\partial t} + \nabla \cdot \rho u = 0 \tag{1}$$

$$\frac{\partial}{\partial t}(\rho u) + \nabla \cdot (\rho u u + \tau) = -\nabla p + \rho g \tag{2}$$

$$\frac{\partial}{\partial t}(T\rho C_p) + \nabla \cdot (\rho u C_p T) = k\nabla^2 T + \eta \dot{\gamma}^2 \tag{3}$$

$$\tau = -\eta(T,\dot{\gamma})(\nabla u + \nabla u^T) \tag{4}$$

where $\rho$ represents the density, t represents the time, u represents the velocity vector (flow velocity), $\tau$ represents the total stress tensor, p represents the pressure, g represents the gravity vector, T represents the temperature, $C_P$ represents the specific heat, k represents the thermal conductivity, $\eta$ represents the viscosity, and $\dot{\gamma}$ represents the shear rate. Where $\rho$ represents the density, t represents the time, u represents the velocity vector (flow velocity), $\tau$ represents the total stress tensor, p represents the pressure, g represents the gravity vector, T represents the temperature, $C_P$ represents the specific heat, k represents the thermal conductivity, $\eta$ represents the viscosity, and $\dot{\gamma}$ represents the shear rate.

Solving the governing equations (1)-(4) requires a transient state analysis, which can be performed numerically by using a computer. Details of the transient state analysis by using a computer are available in the article (Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001), the entirety of which is herein incorporated by reference and will not be repeated. During the transient state analysis, the process variables that change with time are not zero; i.e., the partial derivatives ($\partial/\partial t$) in the governing equations (1)-(4) are not considered zero.

The present disclosure uses the three-dimensional numerical calculation without physical simplifying assumption to directly solve the whole governing equations of the velocity vector and temperature variable. A commercial injection molding simulation software, Moldex3D Solid Model (copyrighted by CoreTech System, Inc., Taiwan), is based on the true solid three-dimensional Finite Volume Method (3D-FVM) technology, which accurately simulates the transient flow field in a complex three-dimensional geometry due to its robustness and efficiency. Details of 3D-FVM are available in the article (Chang R-Y, Yang W-H. Numerical simulation of mold filling in injection molding using a three-dimensional finite volume approach. Int J Numer Methods Fluids 2001; 37:125-148.), the entirety of which is herein incorporated by reference and will not be repeated.

In contrast, the Hele-Shaw approximation (Huynh H M. Improved fiber orientation predictions for injection molded composites. Master's Thesis, University of Illinois at Urbana-Champaign; 2001; Wang J. Improved fiber orientation predictions for injection molded composites. Ph.D. Thesis, University of Illinois at Urbana-Champaign) used in the conventional fiber orientation prediction utilizes two simplifying assumptions: steady state flow and a simple velocity gradient, to simplify the momentum equation describing the molding phenomena of the molding material. Thus, the Hele-Shaw approximation of momentum equation in an end-gated plaque flow is simplified as follows:

$$-\frac{\partial p}{\partial x} + \frac{\partial}{\partial z}\left(\eta \frac{\partial v_x}{\partial z}\right) = 0, 0 = -\frac{\partial p}{\partial y}, 0 = -\frac{\partial p}{\partial z} \quad (5)$$

In particular, the shear rate is simplified from $\dot{\gamma} = \sqrt{2D:D}$ to be $\dot{\gamma} = |\partial v_x/\partial z|$ according to the Hele-Shaw approximation.

In particular, without the two assumptions (steady state flow and a simple velocity gradient) to simplify the momentum equation, the three-dimensional numerical calculation of the Moldex3D Solid Model directly solves the whole governing equations of velocity vector and temperature variable for the nature of flow behavior with high resolution.

In some embodiments, the Yield-WLF-Cross viscosity model (Advani SG. Flow and rheology in polymer composites manufacturing. New York: Elsevier; 1994) that involves the yield-stress viscosity term and the WLF-Cross model are used to describe a viscosity flow curve, as below:

$$\eta(\dot{\gamma}, T, P) = \frac{\tau_y}{\dot{\gamma}} + \frac{\eta_0(T, P)}{1 + \left(\frac{\eta_0 \dot{\gamma}}{\tau^*}\right)^{1-n}} \quad (6)$$

$$\eta_0 = D_1 \exp\left(\frac{-A_1(T - T_c)}{A_2 + (T - T_c)}\right) \quad (7)$$

$$T_c = D_2 + D_3 P \text{ and } A_2 = \tilde{A}_2 + D_3 P \quad (8)$$

Where eight parameters are fit by related experimental data, including n, $\tau^*$, $A_1$, $\tilde{A}_2$, $D_1$, $D_2$, and $D_3$, $\tau_y$.

Figure 13:
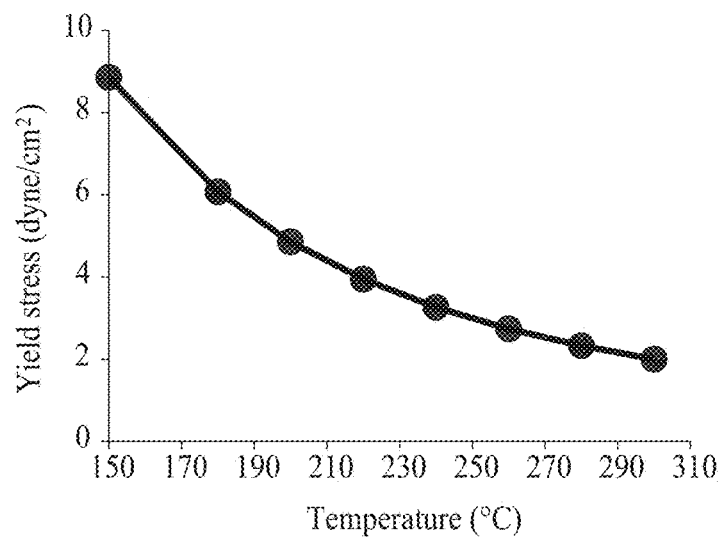
FIG. 13 shows the yield stress as a function of temperature in accordance with various embodiments of the present disclosure.

Provided that the yield stress decreases with increasing temperature for general polymers (Richeton J, Ahzi S, Vecchio K S, Jiang F C, Adharapurapu R R. Influence of temperature and strain rate on the mechanical behavior of three amorphous polymers: Characterization and modeling of the compressive yield stress. International Journal of Solids and Structures 2006; 43:2318-2335), in some embodiments, the Arrhenius-Eyring equation expressing the temperature-dependent yield stress below is incorporated into the conventional Yield-WLF-Cross and WLF-Cross viscosity model.

$$\tau_y(T) = \tau_{y0} \exp\left(\frac{E_y}{RT}\right) \quad (9)$$

Where $\tau_{y0}$ is the reference yield stress, $E_y$ is the activation energy of yield flow, T is the absolute temperature, and R is the gas constant (8.314 J mol K). FIG. 13 shows the yield stress as a function of temperature, in some embodiments, $\tau_{y0}$=0.03 dyne/cm$^2$, $E_y$=20 kJ/mol.

Raw data of viscosity against shear rate can be measured by rotational rheometers to fit the WLF-Cross model parameters including n, $\tau^*$, $A_1$, $\tilde{A}_2$, $D_1$, $D_2$, and $D_3$; however, the Yield-Stress model parameters, $\tau_{y0}$ and $E_y$, are not easily be determined since objective experimental data are hardly measured.

The iARD-RPR model developed by Tseng et al. has been incorporated into the Moldex3D. In the Manufacturing Systems Research Lab of General Motors (GM) Research and Development, Foss et al. utilized the Moldex3D to evaluate the accuracy of orientation predictions for short glass-fiber (Foss P H, Tseng H-C, Snawerdt J, Chang Y-J, Yang W-H, Hsu C-H. Prediction of fiber orientation distribution in injection molded parts using a Moldex3D simulation. Polymer Composites 2014; 35:671-680).

The Moldex3D Solid Model is based on the true solid three-dimensional numerical simulation technology attached with the reliable Yield-WLF-Cross viscosity model and the objective iARD-RPR orientation model. Due to these advantages, the present disclosure uses the Moldex3D to perform injection molding simulation of a fan-gated plaque with a simple geometry, using the 30% GF/PBT composite as the molding material, wherein the processing condition and material properties are the same as the previous project of the Hele-Shaw approximation mentioned above.

Figure 4:
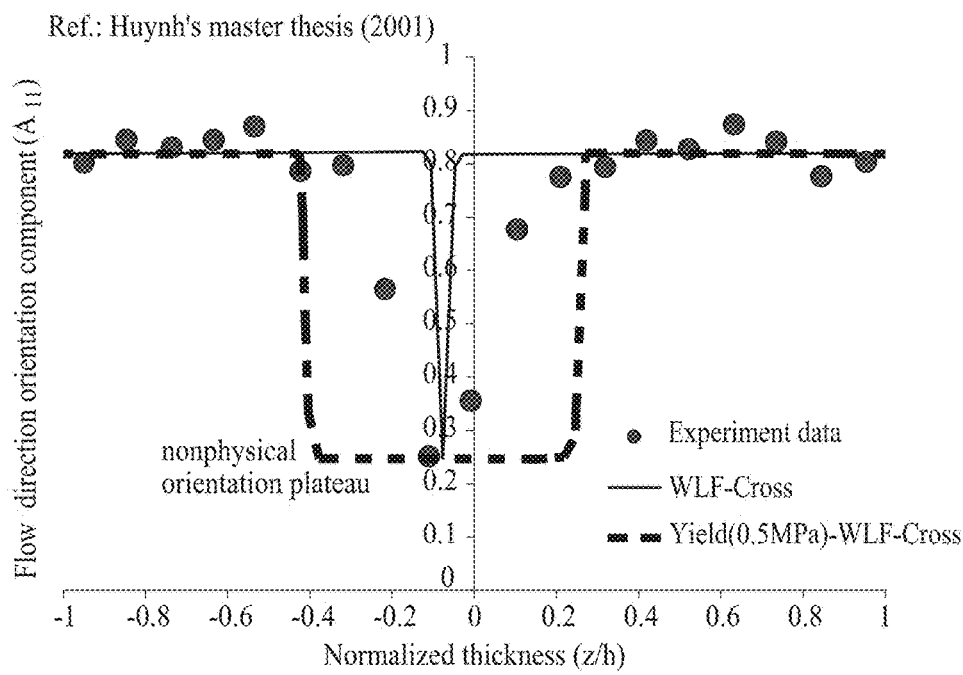
FIG. 4 shows the predicted flow direction orientation component ($A_{11}$) with respect to the normalized thickness (z/h), using different viscosity models according to the prior art.
Figure 14:
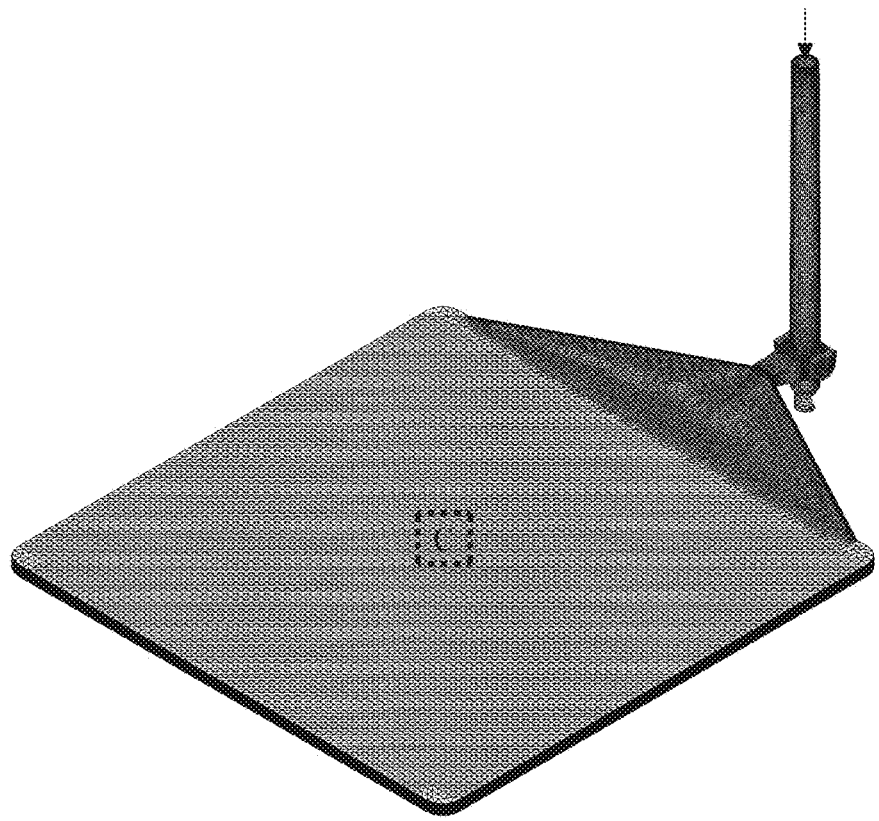
FIG. 14 shows the 3D-mesh geometry of a fan-gated plaque with one measure region C marked at the center plaque in accordance with some embodiment of the present disclosure.
Figure 15:
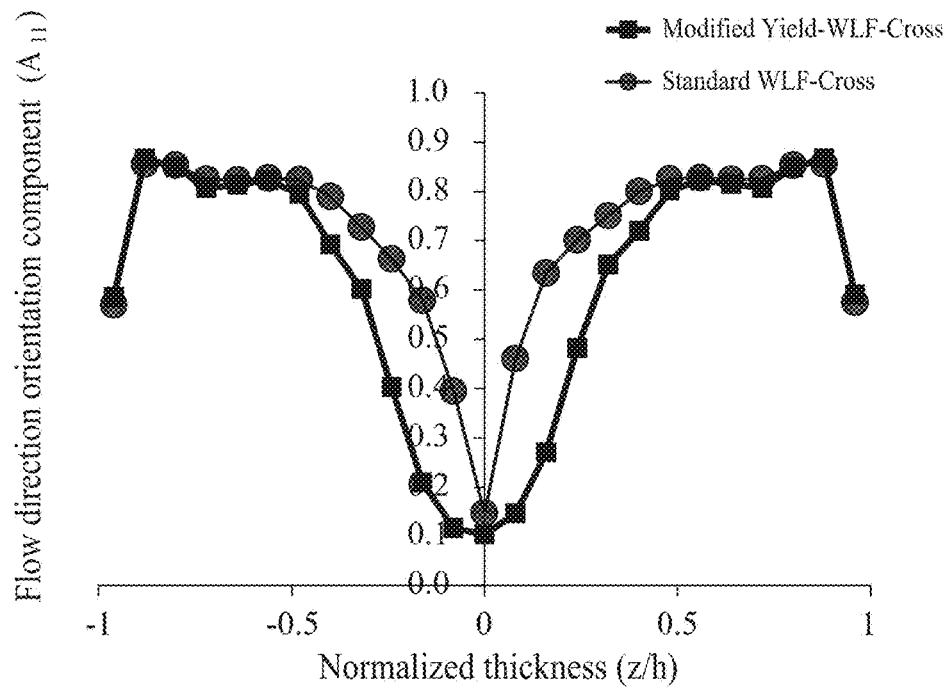
FIG. 15 shows the predicted fiber orientation distribution with respect to the normalized thickness (z/h) at region C of the fan-gated plaque (FIG. 1) for the 30% GF/PBT, using different viscosity models in accordance with various embodiments of the present disclosure.

FIG. 14 shows the 3D-mesh geometry of a fan-gated plaque with one measure region C marked at the center plaque in accordance with some embodiment of the present disclosure, and FIG. 15 shows the predicted fiber orientation distribution with respect to the normalized thickness (z/h) at region C of the fan-gated plaque (FIG. 1) for the 30% GF/PBT, using different viscosity models in accordance with various embodiments of the present disclosure. It is obvious that a broader core is associated with the modified Yield-WLF-Cross model and a narrower core is associated with the standard WLF-Cross model. More importantly, such a broader core of the modified Yield-WLF-Cross model is a smooth parabolic curve, differing from the non-physical flat plateau in the conventional fiber prediction method as shown in FIG. 4. This result objectively demonstrates the feasibility of the present disclosure.

Figure 16:
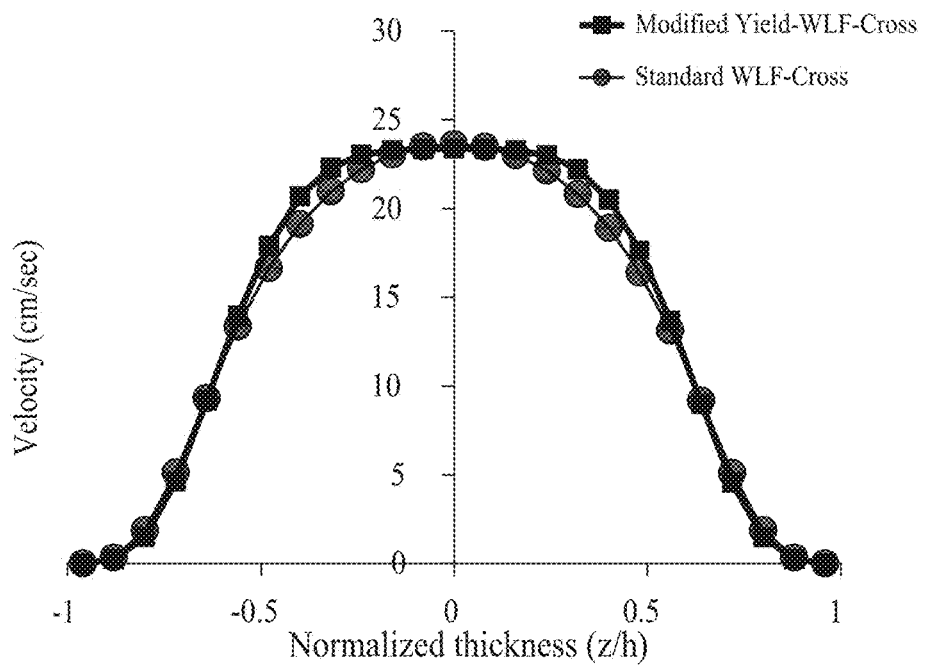
FIG. 16 shows the predicted velocity profile with respect to the normalized thickness (z/h) at region C of the fan-gated plaque (FIG. 1) for the 30% GF/PBT, using different viscosity models in accordance with various embodiments of the present disclosure.
Figure 17:
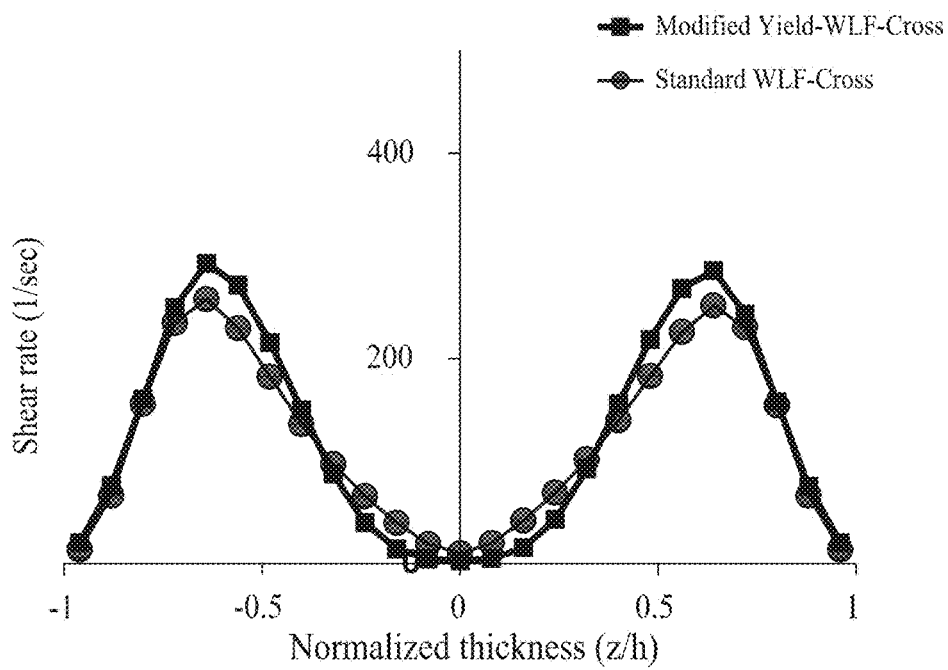
FIG. 17 shows the predicted shear rate profile with respect to the normalized thickness (z/h) at region C of the fan-gated plaque (FIG. 1) for the 30% GF/PBT, using different viscosity models in accordance with various embodiments of the present disclosure.

FIG. 16 shows the predicted velocity profile with respect to the normalized thickness (z/h) at region C of the fan-gated plaque (FIG. 1) for the 30% GF/PBT, using different viscosity models in accordance with various embodiments of the present disclosure, and FIG. 17 shows the predicted shear rate profile with respect to the normalized thickness (z/h) at region C of the fan-gated plaque (FIG. 1) for the 30% GF/PBT, using different viscosity models in accordance with various embodiments of the present disclosure. The standard WLF-Cross model shows the parabolic velocity and shear rate profiles, but with a narrow-core orientation distribution (FIG. 15). In contrast, the modified Yield-WLF-Cross model shows a plug flow velocity profile (FIG. 16) and a broad-core orientation distribution (FIG. 15). As shown in FIG. 17, the zero-shear-rate phenomenon does not occur over the whole core region, differing from the conventional prediction shown in FIG. 10. Thus, the predicted result of the present disclosure has no non-physical flat plateau of fiber orientation.

Figure 18:
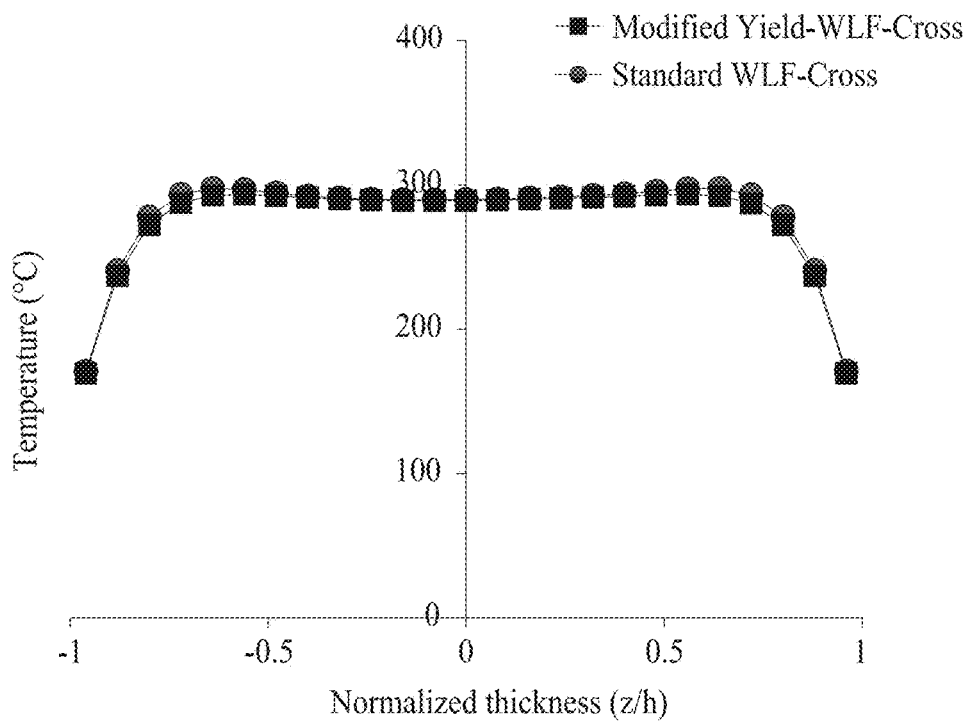
FIG. 18 shows the predicted temperature profile with respect to the normalized thickness (z/h) at region C of the fan-gated plaque (FIG. 1) for the 30% GF/PBT, using different viscosity models in accordance with various embodiments of the present disclosure.

FIG. 18 shows the predicted temperature profile with respect to the normalized thickness (z/h) at region C of the fan-gated plaque (FIG. 1) for the 30% GF/PBT, using different viscosity models in accordance with various embodiments of the present disclosure. As shown in FIG. 18, the temperature profiles of both viscosity models have no substantial difference.

In some embodiment of the present disclosure, two yield-stress rheology parameters, $\tau_{y0}$ and $E_r$, and three iARD-RPR orientation parameters, $C_I$, $C_M$ and $\alpha$, are used to predict evolution of flow field and fiber orientation during the mold filling. Using the Moldex3D as a fitting platform, these parameters are fitted via experimental fiber orientation distributions in an injection molding for composite articles with simple geometry, such as end-gated strips and center-gated disks. The aim of this disclosure is to apply the fitted parameters in a real injection molding simulation of a fiber reinforced composite article with a complex 3-D geometry.

Figure 19A:
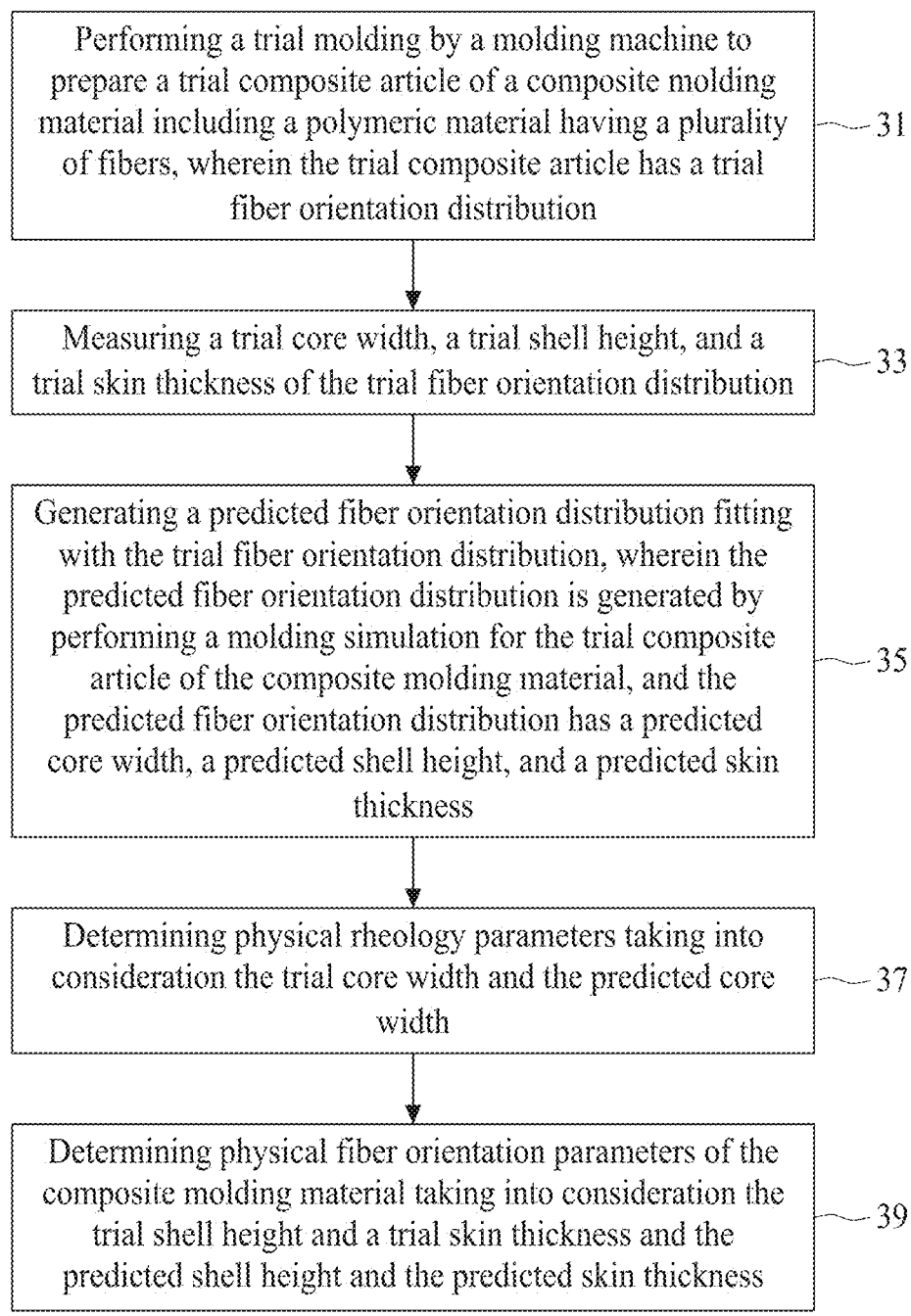
FIG. 19A is a flow chart showing a method for measuring physical parameters of a composite molding material by using a computer-aided engineering (CAE) simulation in accordance with some embodiments of the present disclosure.

FIG. 19A is a flow chart 30 showing a method for measuring physical parameters of a composite molding material by using a computer-aided engineering (CAE) simulation in accordance with some embodiments of the present disclosure. In some embodiments, the method comprises a step 31 of performing a trial molding by a molding machine to prepare a trial composite article of a composite molding material including a polymeric material having a plurality of fibers, wherein the trial composite article has a trial fiber orientation distribution; a step 33 of measuring a trial core width, a trial shell height, and a trial skin thickness of the trial fiber orientation distribution; a step 35 of generating a predicted fiber orientation distribution fitting with the trial fiber orientation distribution, wherein the predicted fiber orientation distribution is generated by performing a molding simulation for the trial composite article of the composite molding material, and the predicted fiber orientation distribution has a predicted core width, a predicted shell height, and a predicted skin thickness; a step 37 of determining physical rheology parameters when taking into consideration the trial core width and the predicted core width; and a step 39 of determining physical fiber orientation parameters of the composite molding material when taking into consideration the trial shell height and a trial skin thickness and the predicted shell height and the predicted skin thickness.

Figure 19B:
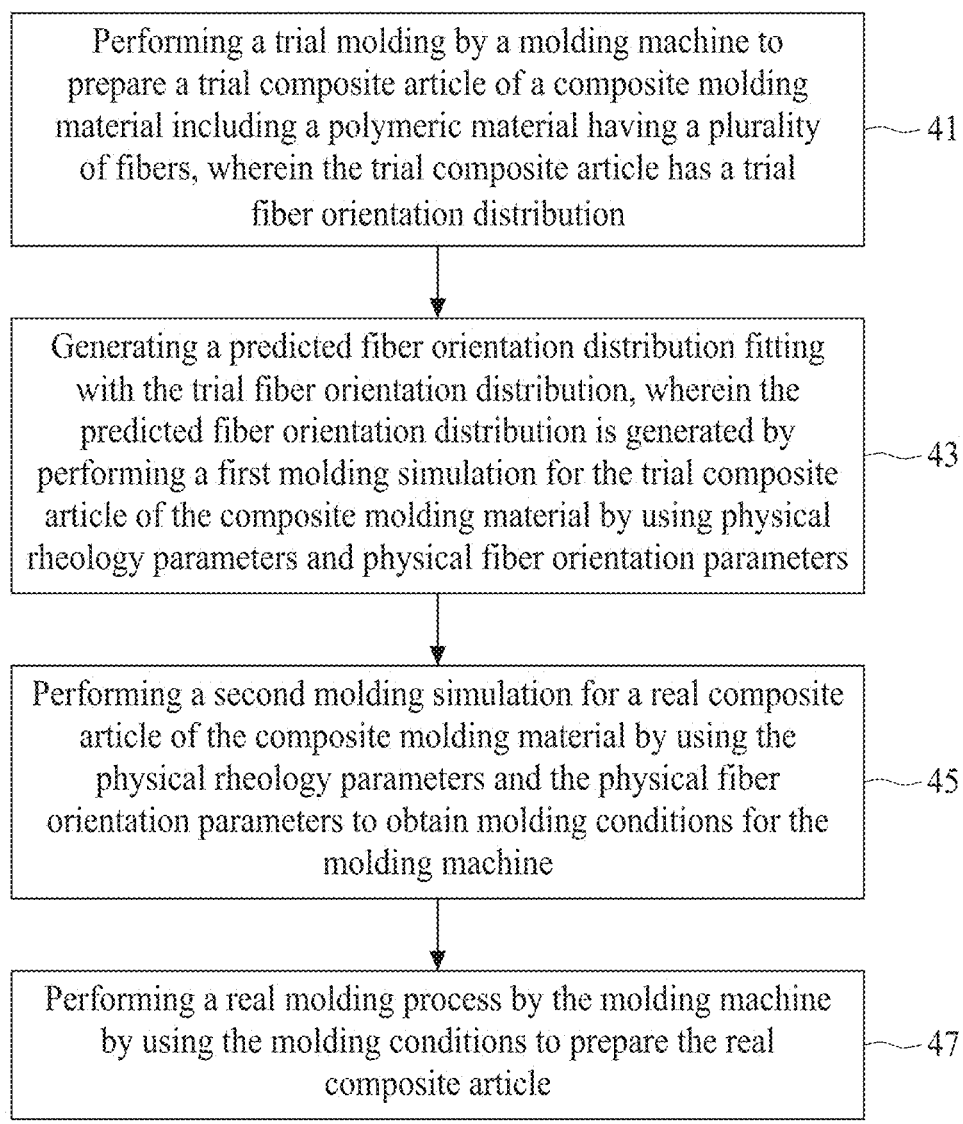
FIG. 19B is a flow chart showing a method for preparing a fiber-reinforced composite article having a complex geometry by using a computer-aided engineering (CAE) simulation in accordance with some embodiments of the present disclosure.

FIG. 19B is a flow chart 40 showing a method for preparing a fiber-reinforced composite article having a complex geometry by using a computer-aided engineering (CAE) simulation in accordance with some embodiments of the present disclosure. In some embodiments, the method comprises a step 41 of performing a trial molding by a molding machine to prepare a trial composite article of a composite molding material including a polymeric material having a plurality of fibers, wherein the trial composite article has a trial fiber orientation distribution; a step 43 of generating a predicted fiber orientation distribution fitting with the trial fiber orientation distribution, wherein the predicted fiber orientation distribution is generated by performing a first molding simulation for the trial composite article of the composite molding material by using physical rheology parameters and physical fiber orientation parameters; a step 45 of performing a second molding simulation for a real composite article of the composite molding material by using the physical rheology parameters and the physical fiber orientation parameters to obtain molding conditions for the molding machine; and a step 47 of performing a real molding process by the molding machine by using the molding conditions to prepare the real composite article.

Figure 19C:
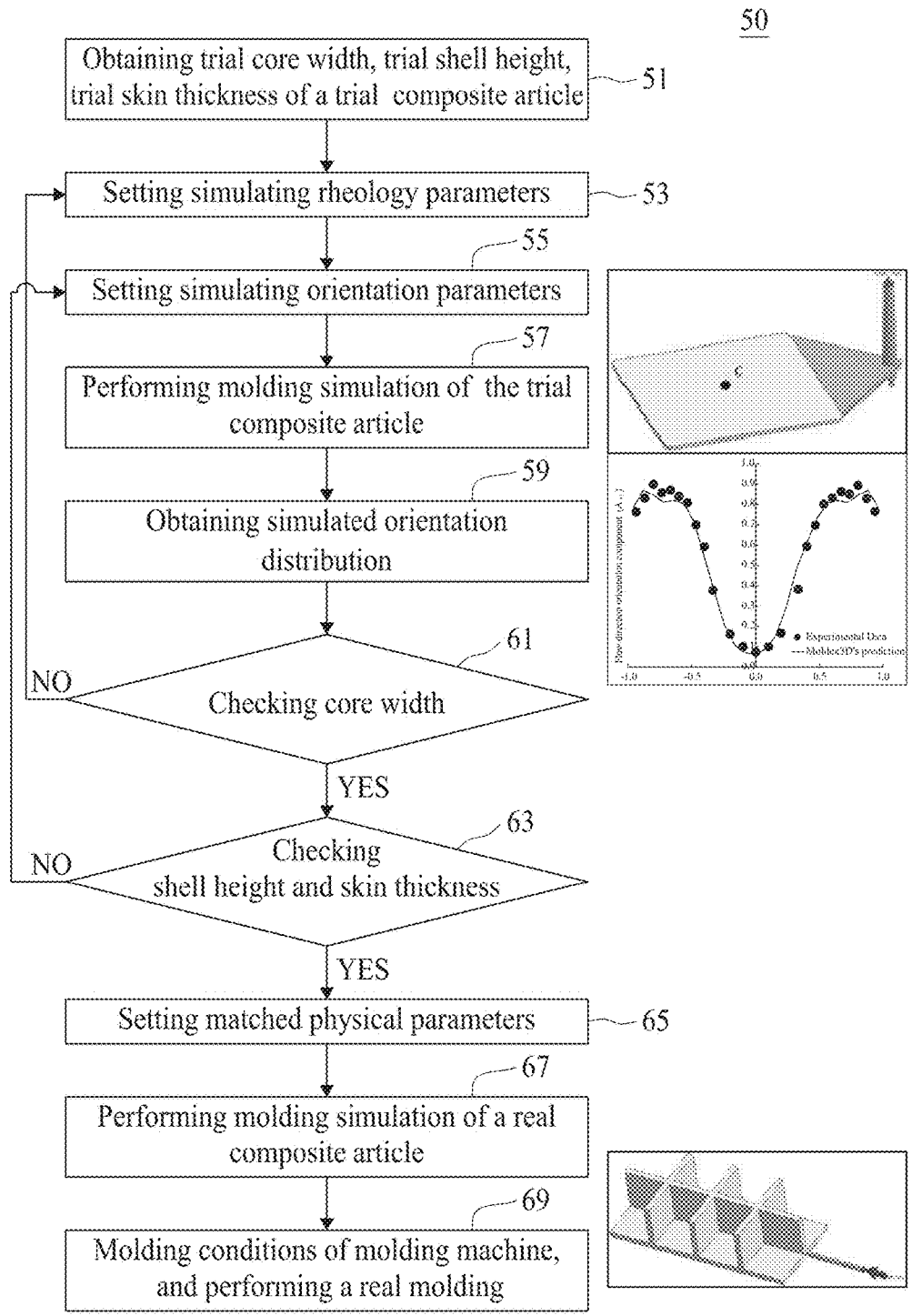
FIG. 19C is a flow chart showing a method for preparing a fiber-reinforced composite article having a complex geometry by using a computer-aided engineering (CAE) simulation in accordance with some embodiments of the present disclosure.

FIG. 19C is a flow chart 50 showing a method for preparing a fiber-reinforced composite article having a complex geometry by using a computer-aided engineering (CAE) simulation in accordance with some embodiments of the present disclosure. The following paragraphs describe the methods in detail.

Figure 1:
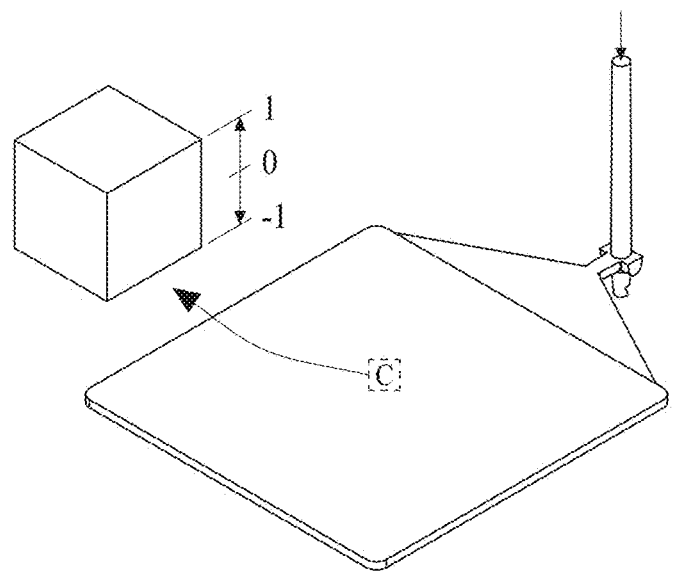
FIG. 1 shows an FRT composite article with a fan-gated plaque geometry having a marked region C at the center according to the prior art.

In step 51, initially, a trial molding is performed by the molding machine shown in FIG. 5 to prepare a trial composite article of the composite molding material having a simple geometry, like that shown in FIG. 1, and a micro computerized tomography (CT) is performed to measure a trial fiber orientation distribution having a trial core width, a trial shell height, and a trial skin thickness of the trial composite article. In some embodiments, the trial composite article has a center-gated disk geometry, a fan-gated plaque geometry or an end-gated plaque geometry. Details of the micro computerized tomography (CT) are available in the article (Umesh Gandhi, Method to measure orientation of discontinuous fiber embedded in the polymer matrix from computerized tomography scan data. Journal of Thermoplastic Composite Materials May 7, 2015), the entirety of which is herein incorporated by reference and will not be repeated.

Step 53 and step 55 the initial yield stress parameters and initial fiber orientation parameters are set for the molding simulation, respectively. In some embodiments, the initial yield stress parameters ($\tau_{y0}$ and $E_y$) for the modified viscosity models and initial fiber orientation parameters ($C_I$, $C_M$ and $\alpha$) for the iARD-RPR model are set in step 53 and step 55, respectively, for the subsequent molding simulation, such as the CAE (Moldex3D) simulation.

In step 57, the CAE molding simulation is performed for the trial composite article; and in step 59, a predicted fiber orientation distribution with a predicted core width can be obtained from the simulation result.

In step 61, if the predicted core width from step 59 is not fitted with the trial core width from step 51, the simulating yield stress parameters are updated in step 53 and the CAE molding simulation is repeated in step 57.

If affirmative in step 61; the flow proceeds to step 63, where a predicted shell height and a predicted skin thickness from the simulation result (predicted fiber orientation distribution) are compared with the trial shell height and the trial skin thickness of the trial fiber orientation distribution from step 51 so as to check if the predicted shell height and the predicted skin thickness are fitted with the trial shell height and the trial skin thickness. If not affirmative in step 63, the simulating fiber orientation parameters are updated in step 55, and the CAE molding simulation is repeated in step 57.

If affirmative in step 63, the flow proceeds to the step 65, where the simulating parameters (yield stress parameters and orientation parameters) are considered matched physical parameters of the composite molding material.

In step 67, these matched physical parameters are used to perform the CAE molding simulation of a real composite article with a complex geometry so as to obtain molding conditions for the molding machine. In some embodiments, the molding conditions include the mold temperature, resin temperature, injection pressure, injection time (or speed), packing pressure, packing time, and so on.

In step 69, the molding conditions of the molding machine are set, and a real molding is performed to prepare the real composite article with a complex geometry.

The following paragraphs will describe further the flow chart 50 for preparing a fiber-reinforced composite article having a complex geometry by using computer-aided engineering (CAE) in accordance with some embodiments of the present disclosure.

The yield-stress model parameters (such as $\tau_{y0}$ and $E_\gamma$) and the fiber orientation parameters (such as $C_I$, $C_M$ and $\alpha$ for the iARD-RPR model) cannot be easily determined since objective experimental data are hardly measured. In the present disclosure, the core width of the composite article is correlated with the yield stress parameters, and the shell height and the skin thickness are correlated with the fiber orientation parameters.

To obtain the physical parameters, the CAE injection molding simulation capable of predicting the fiber orientation distribution (e.g., Moldex3D) is used to perform the injection molding simulation of the trial composite article of a fiber-reinforced molding material (40 wt % LGF/PP composite resin). FIG. 1 shows the geometry of the trial composite article with one region C marked at the center. In the beginning, the initial yield stress parameters ($\tau_{y0}$ and $E_\gamma$) for the modified viscosity models and initial fiber orientation parameters ($C_I$, $C_M$ and $\alpha$) for the iARD-RPR model are provided. Subsequently, the two yield stress parameters ($\tau_{y0}$ and $E_\gamma$) are finely tuned such that the simulated orientation distribution is well fitted with the measured orientation distribution in terms of the core width.

On a condition that the simulated core width well fits with the measured core width, the orientation parameter $C_I$ representing a fiber-fiber interaction is finely tuned to control the shell height, the orientation parameter $C_M$ representing a fiber-matrix interaction is finely tuned to control a ratio between the core width and the skin thickness, and the orientation parameter $\alpha$ representing an orientation-to-random process of the fibers is finely tuned to control the skin thickness.

Figure 20:
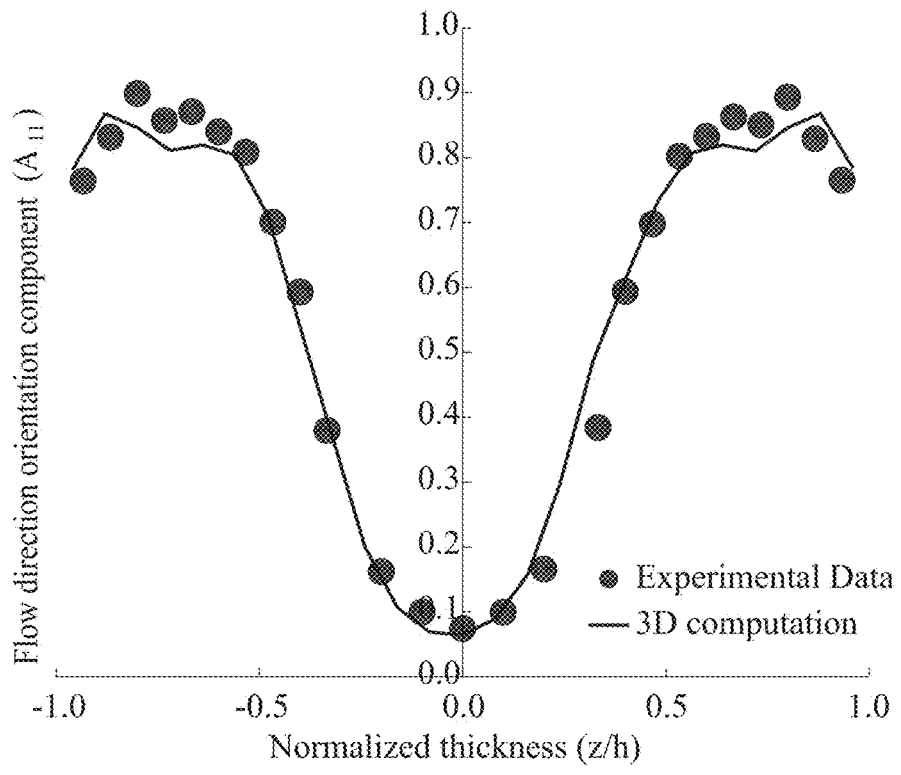
FIG. 20 shows the predicted flow direction orientation component ($A_{11}$) with respect to the normalized thickness (z/h) at region C of the fan-gated plaque (FIG. 1) for a fiber-reinforced molding material (40 wt % LGF/PP composite resin) in accordance with some embodiments of the present disclosure.

FIG. 20 shows the predicted flow direction orientation component ($A_{11}$) with respect to the normalized thickness (z/h) at region C of the fan-gated plaque (FIG. 1) for a fiber-reinforced molding material (40 wt % LGF/PP composite resin) in accordance with some embodiments of the present disclosure. As shown in FIG. 20, the predicted data well matches with the measured data; in particular, the predicted core width using the yield stress parameters ($\tau_{y0}$ and $E_\gamma$) matches with the measured core width. In other words, the yield stress parameters ($\tau_{y0}$ and $E_\gamma$) are correlated with the fiber-reinforced molding material.

Figure 21:
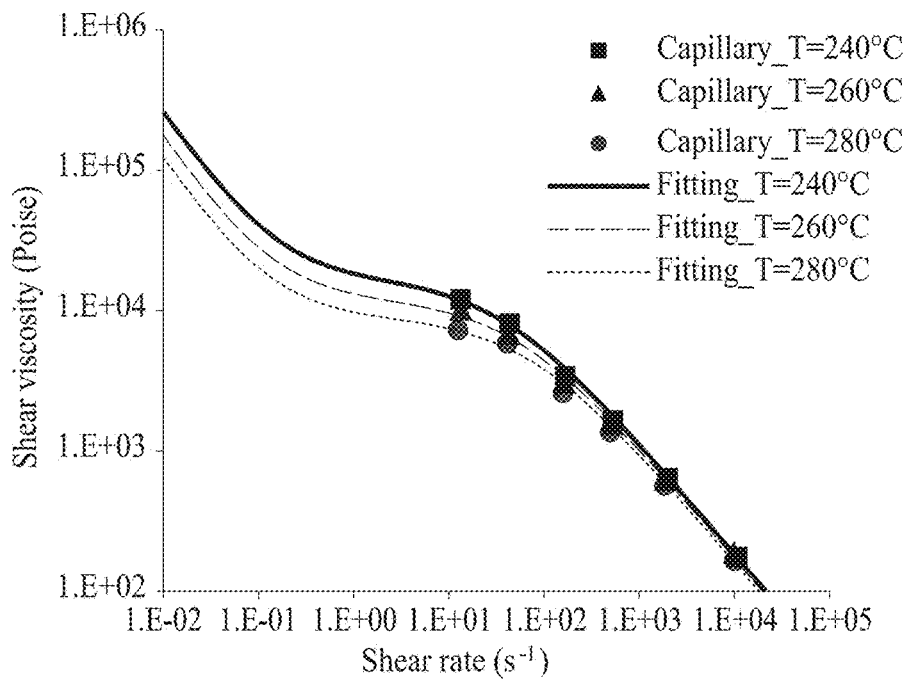
FIG. 21 shows the variation of the shear viscosity (η) with respect to the shear rate for the molding material (40 wt % LGF/PP composite resin) in accordance with various embodiments of the present disclosure.

FIG. 21 shows the variation of the shear viscosity ($\eta$) with respect to the shear rate for the molding material (40 wt % LGF/PP composite resin) in accordance with various embodiments of the present disclosure. After obtaining the matched yield stress parameters ($\tau_{y0}$ and $E_\gamma$), the variation of the shear viscosity ($\eta$) with respect to the shear rate can be calculated according to the equations (6)-(9). As shown in FIG. 21, the calculated data well fits the experimental viscosity data measured by the capillary viscometer, wherein obtaining the repeatable low-shear-rate yield stress viscosity is not easy to be measured by the rotational viscometer or capillary viscometer for such a high long fiber concentration of the composite resin.

Figure 22:
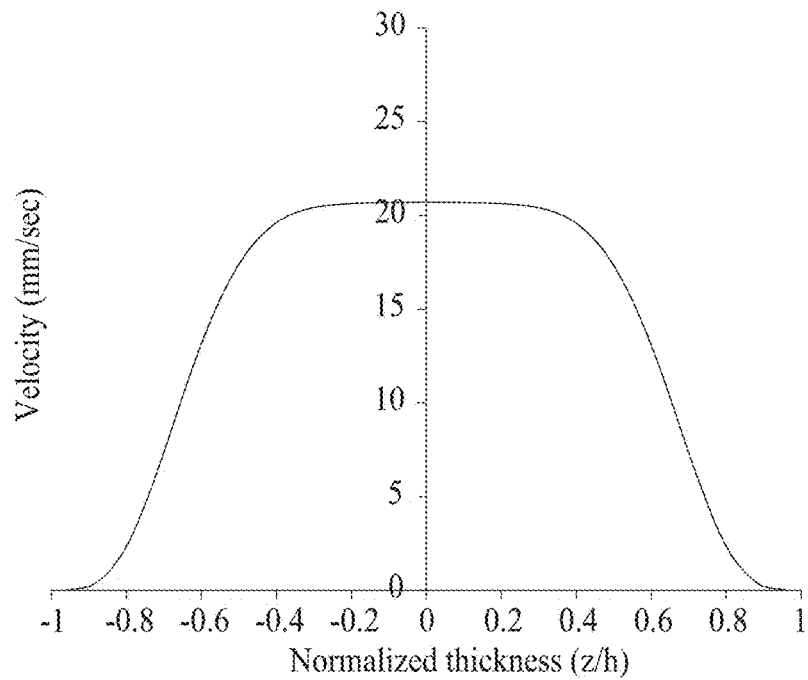
FIG. 22 shows the predicted velocity profile with respect to the normalized thickness (z/h) of the fan-gated plaque (FIG. 1) for the molding material (40 wt % LGF/PP composite resin) in accordance with various embodiments of the present disclosure.

FIG. 22 shows the predicted velocity profile with respect to the normalized thickness (z/h) of the fan-gated plaque (FIG. 1) for the molding material (40 wt % LGF/PP composite resin) in accordance with various embodiments of the present disclosure. As shown in FIG. 22, the predicted velocity profile is a reliable plug-flow velocity profile, correspondingly to a greater core width in FIG. 20. Overall, the velocity profile, the shear viscosity curve and the orientation distribution are in good agreement with the experimental results of the fiber-reinforced composite article with a higher fiber concentration or longer fiber length (Laun H M. Orientation effects and rheology of short glass fiber-reinforced thermoplastics. Colloid Polym Sci 1984; 262: 257-269 and Darlington M W, Smith A C. Some features of the molding of short fiber reinforced thermoplastics in center sprue-gated cavities. Polymer Composites 1987; 8:16-21).

Figure 23:
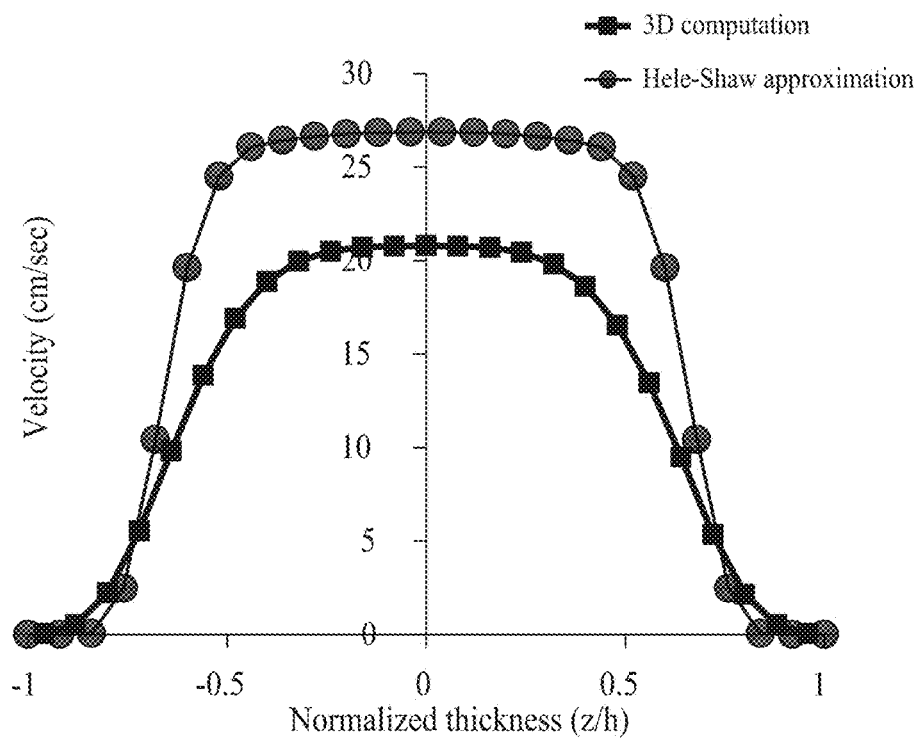
FIGS. 23-25 show the predicted velocity profile, the predicted shear rate profile and the predicted fiber orientation distribution with respect to the normalized thickness (z/h) at region C of the fan-gated plaque (FIG. 1) for the 40 wt % LGF/PP composite resin, using the Hele-Shaw approximation with two simplifying physical assumptions and the 3D computation without physical simplifying assumption (Moldex3D Solid Model) in accordance with various embodiments of the present disclosure.
Figure 24:
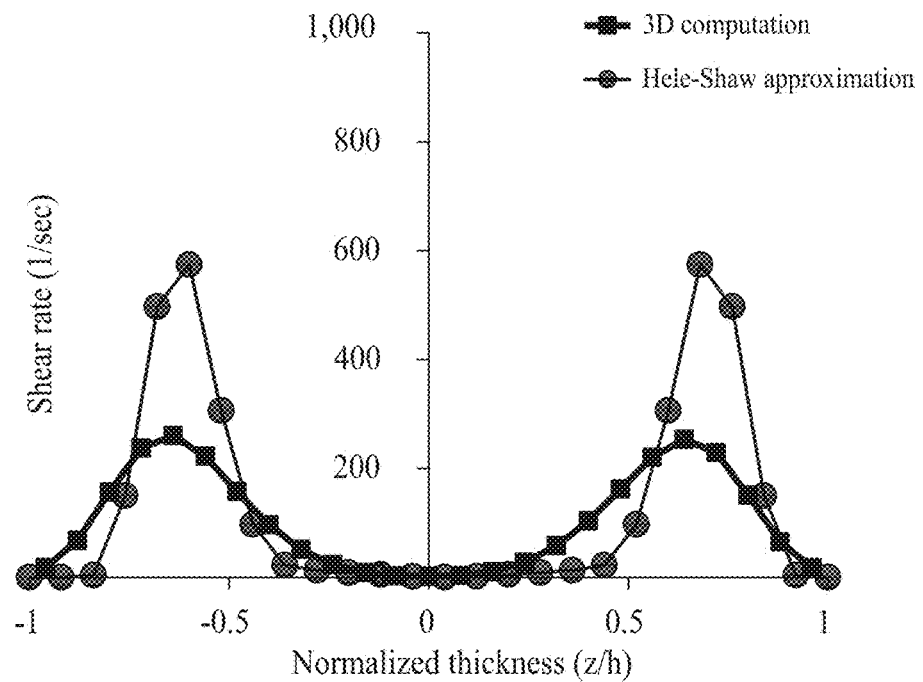
Figure 25:
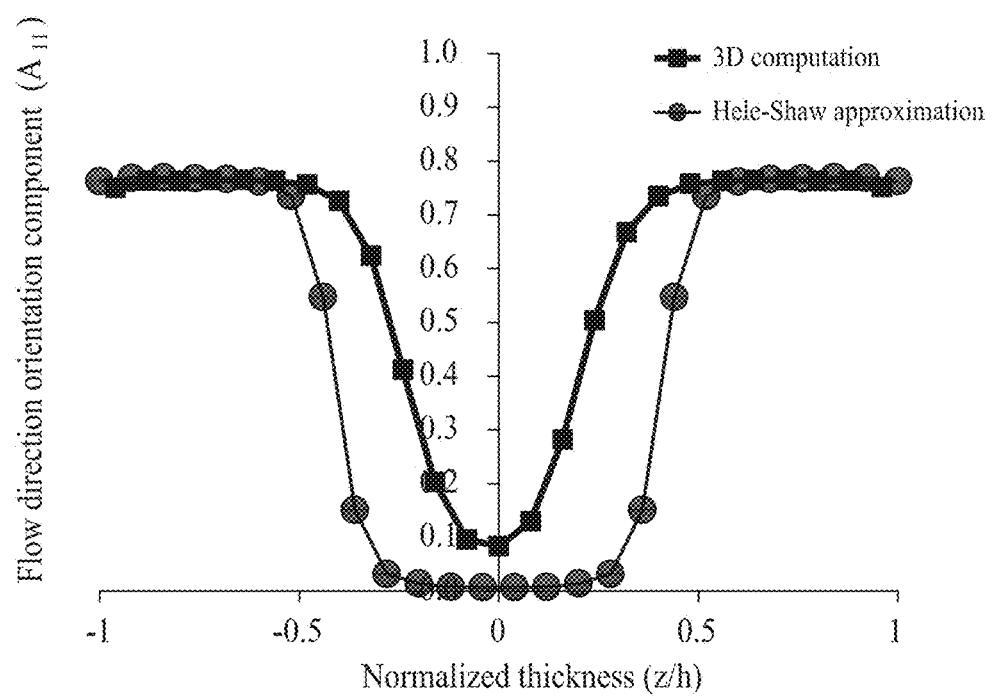

FIGS. 23-25 show the predicted velocity profile, the predicted shear rate profile and the predicted fiber orientation distribution with respect to the normalized thickness (z/h) at region C of the fan-gated plaque (FIG. 1) for the 40 wt % LGF/PP composite resin, using the Hele-Shaw approximation with two simplifying physical assumptions and the 3D computation without physical simplifying assumption (Moldex3D Solid Model) in accordance with various embodiments of the present disclosure. The Moldex3D Solid Model is a commercial three-dimensional numerical simulator without physical simplifying assumption and is used to directly solve the whole governing equations (1)-(4) of velocity vector and temperature variable. In contrast, the Hele-Shaw approximation utilizes two simplifying assumptions: steady state flow and a simple velocity gradient, to simplify the momentum equation, i.e., equation (5). In addition, FIGS. 23-25 use the same rheology parameter ($\tau_{y0}$ and $E_\gamma$) and fiber orientation parameters ($C_I$, $C_M$ and $\alpha$).

The following table summarizes the difference between the present disclosure and the conventional work of Huynh.

| Models | Huynh's work | Present disclosure |
|---|---|---|
| Governing Equations | Hele-Shaw approximation with physical assumptions | Direct 3D numerical calculation without physical assumption |
| Shear Rate | $\dot{\gamma} = \left\|\dfrac{\partial v_x}{\partial z}\right\|$ one component of velocity gradient tensor | $\dot{\gamma} = \sqrt{2D:D}$, related to nine components of velocity gradient tensor $D:D = \text{trace}(D \otimes D) =$ $\left(\dfrac{\partial v_x}{\partial x}\right)^2 + \left(\dfrac{\partial v_y}{\partial y}\right)^2 + \left(\dfrac{\partial v_z}{\partial z}\right)^2 +$ $\dfrac{1}{2}\left(\left(\dfrac{\partial v_x}{\partial y}\right)^2 + \left(\dfrac{\partial v_y}{\partial x}\right)^2\right) +$ $\dfrac{1}{2}\left(\left(\dfrac{\partial v_x}{\partial z}\right)^2 + \left(\dfrac{\partial v_z}{\partial x}\right)^2\right) +$ $\dfrac{1}{2}\left(\left(\dfrac{\partial v_y}{\partial z}\right)^2 + \left(\dfrac{\partial v_z}{\partial y}\right)^2\right) +$ $\left(\dfrac{\partial v_x}{\partial y}\dfrac{\partial v_y}{\partial x}\right) +$ $\left(\dfrac{\partial v_x}{\partial z}\dfrac{\partial v_z}{\partial x}\right) + \left(\dfrac{\partial v_y}{\partial z}\dfrac{\partial v_z}{\partial y}\right)$ |
| Yield-Stress Model | Shear-rate-dependent Yield-Stress: Papanastasiou Model, $\tau_y(\dot{\gamma}) = \tau_{y0}[1 - \exp(-\alpha\dot{\gamma})]$ | Temperature-dependent Yield Stress: Arrhenius-Eyring Model, $\tau_y = \tau_{y0}\exp\left(\dfrac{E_y}{RT}\right)$ |
| Orientation Model | Isotropic Orientation Model: Folgar-Tucker equation (only one parameter $C_I$) | Anisotropic Orientation Model: iARD-RPR equation (three parameters ($C_I$, $C_M$, $\alpha$) |

In FIG. 23, the velocity profile of the Hele-Shaw approximation has a wider plateau over the core region, while the 3D computation has a narrower one over the core region. In addition, the highest velocity of the Hele-Shaw approximation is larger than that of the 3D computation. In FIG. 24, as the shear rate is the gradient of the velocity, the shear rate profile of the Hele-Shaw approximation has a wider plateau with zero shear rate over the core region, while the 3D computation has a narrower plateau with zero shear rate over the core region. In addition, the Hele-Shaw approximation has a dramatic shear rate variation because of the high velocity variation from the core region to the shell region, while the 3D computation has a relatively smooth shear rate variation because of the relatively low velocity variation from the core region to the shell region. Consequently, in FIG. 25, the Hele-Shaw approximation clearly shows a non-physical flat orientation plateau, or a well over the core region and a broad core region; in contrast, the 3D computation shows no non-physical flat orientation plateau over the core region.

Figure 26:
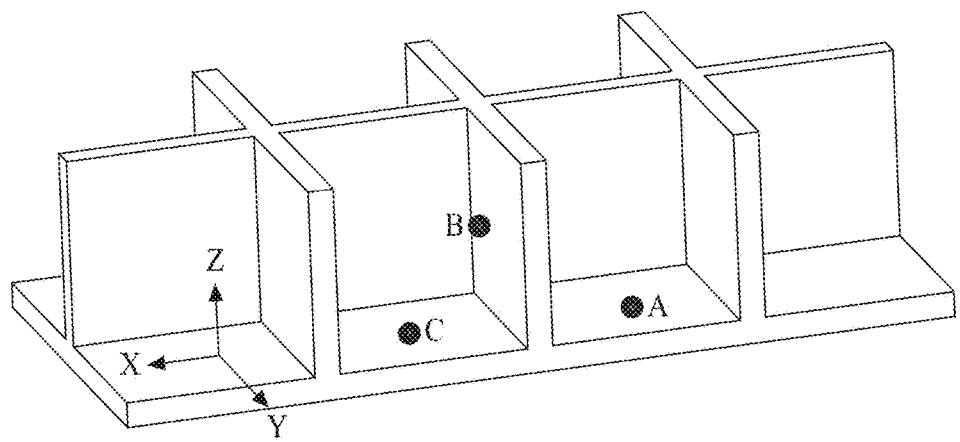
FIG. 26 shows the complex geometry of a fiber-reinforced composite article with three marked regions A, B, C in accordance with some embodiments of the present disclosure.
Figure 27:
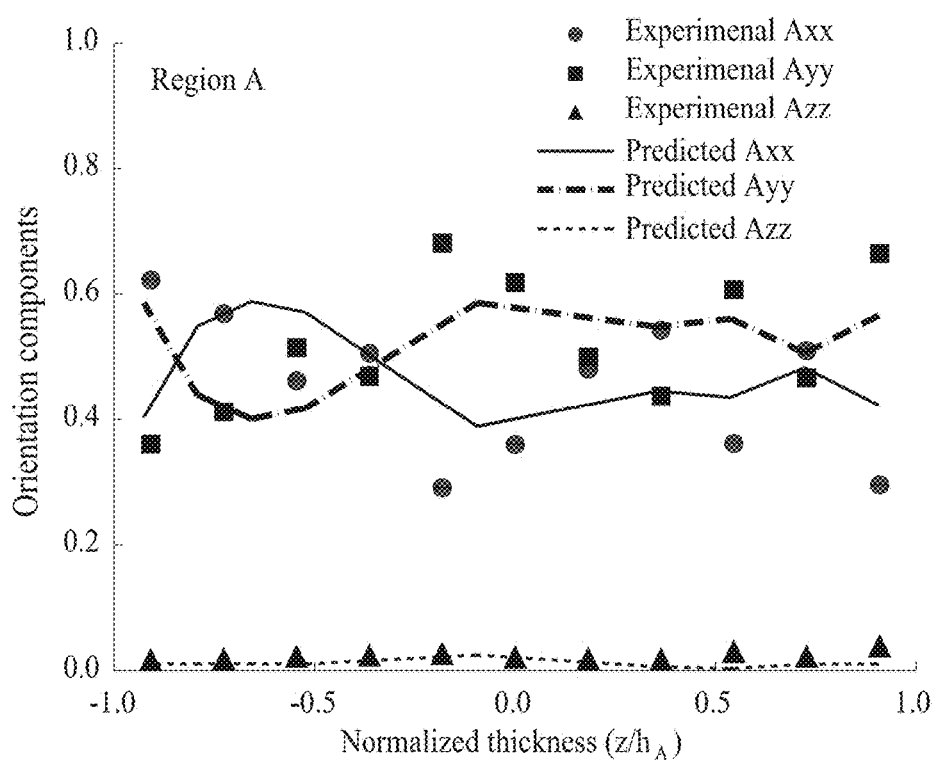
FIGS. 27-29 compare the experimental data with the predicted data at the three marked regions A, B, C in accordance with some embodiments of the present disclosure.
Figure 28:
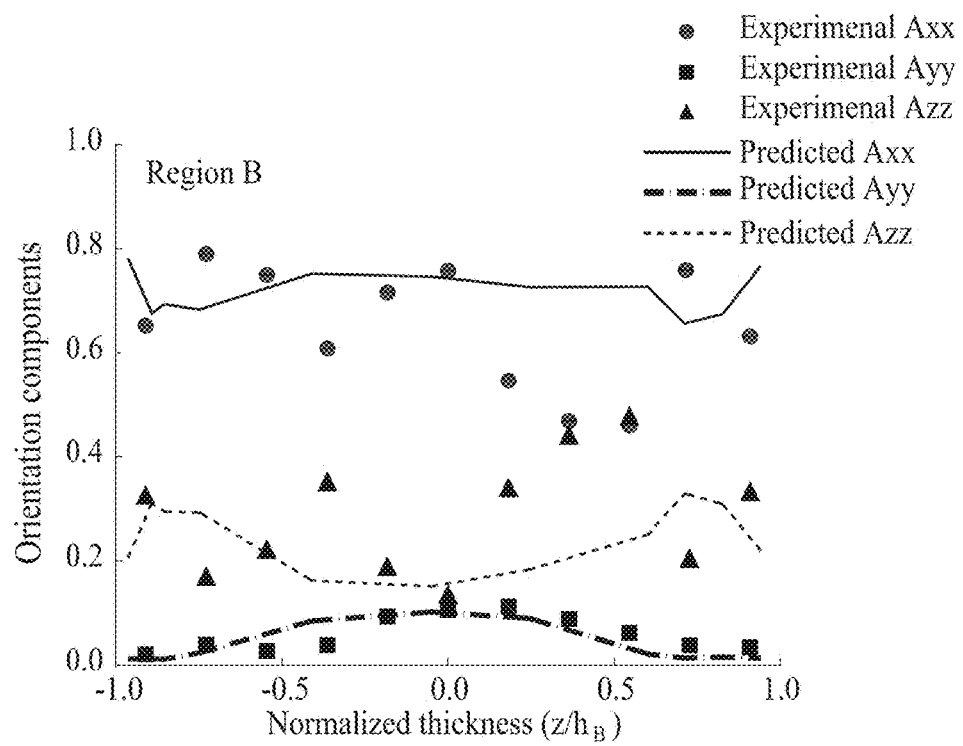
Figure 29:
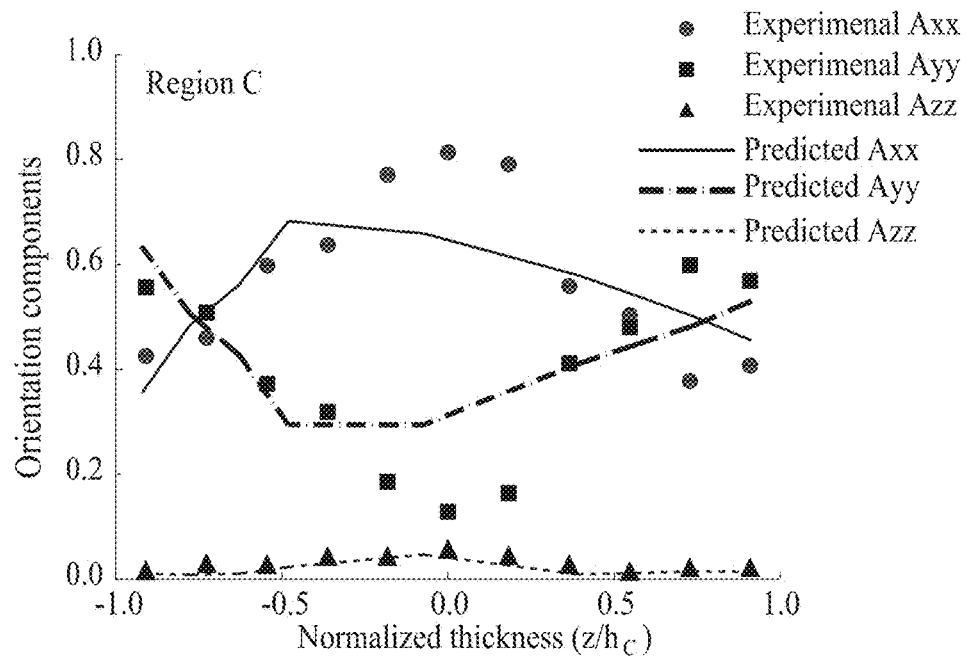

The following describe the application of the simulation result (the matched physical parameters) to a fiber-reinforced composite article with a complex geometry. FIG. 26 shows the complex geometry of a fiber-reinforced composite article with three marked regions A, B, C in accordance with some embodiments of the present disclosure, and FIGS. 27-29 compare the experimental data with the predicted data at the three marked regions A, B, C in accordance with some embodiments of the present disclosure, wherein three orientation tensor components, Axx, Ayy and Azz, are corresponding to the degree of orientation of fibers along the x-axis, y-axis and z-axis directions, respectively.

In some embodiments, the molding material is the 40 wt % LGF/PP fiber-reinforced composite resin, and the Moldex3D is used to performed a molding simulation for the designed geometry, as well as these matched physical parameters, including $\tau_{y0}$, $E_y$, $C_I$, $C_M$ and $\alpha$. As shown in FIGS. 27-29, the difference between the predicted data and the experimental data is small for a complex geometric molding.

The mechanical property of the molding product is correlated with the orientation distribution of the fibers; for example, the elastic modulus is strongly dependent on the fiber orientation. If the simulated orientation distribution of the fibers with the corresponding mechanical property does not meet the specification of the molding composite article, the fiber parameters and/or molding conditions may be adjusted, and another CAE molding simulation is performed to obtain an updated orientation distribution of the fibers while using the adjusted fiber parameters and/or molding condition, wherein the fiber parameters include the concentration of the fibers in the fluid, the fiber aspect ratio, and the shape factor; and the molding conditions include the resin filling rate, metal mold temperature, and the melting resin temperature.

One aspect of the present disclosure is to predict a broad core region by a modified Yield-WLF-Cross viscosity model. A commercial injection molding simulation software, Moldex3D Solid Model (copyrighted by CoreTech System, Inc., Taiwan), is based on the true solid three-dimensional Finite Volume Method (3D-FVM) technology, which accurately simulates the transient flow field in a complex three-dimensional geometry due to its robustness and efficiency. The iARD-RPR fiber orientation model has been demonstrated as an available model for predicting short/long fiber orientation. Among the modified Yield-WLF-Cross model, the Arrhenius-Eyring equation is incorporated to express the temperature-dependent yield stress, and is combined with the Yield-WLF-Cross model. Therefore, the Moldex3D computational platform uses an iARD-RPR model and modified Yield-WLF-Cross model to predict fiber orientation distribution in an injection molding of a fiber-reinforced composite article with simple plaque geometry. Consequently, the core region is sufficiently widened with a smooth parabolic orientation well, which is more reasonable than Huynh's work. It appears that this result matches the experimental data. For fiber orientation prediction, it is critical that the Moldex3D provides accurate shear rates averaged by nine components of velocity-gradient tensor and uses reliable yield-stress viscosity, and that the objective iARD-RPR model yields an anisotropic fiber orientation.

In some embodiment of the present disclosure, two Arrhenius-Eyring parameters of yield stress ($\tau_{y0}$ and $E_y$) and three iARD-RPR parameters of fiber orientation ($C_I$, $C_M$ and $\alpha$) are used to predict evolution of flow filed and fiber orientation. In some embodiment of the present disclosure, the Moldex3D is used as a computational platform for exemplary, simple geometric injection molding, including end-gated strips and center-gated disks. Predicted fiber orientation distributions are determined by controlling these parameters and the predicted fiber orientation distributions are compared with experimental fiber orientation distributions. Thus, the ultimate objective of this disclosure is that the matched physical parameters are applied to the preparation of a real fiber-reinforced composite article with a complex 3-D geometry by injection molding.

Conventionally, the rheology parameters, such as the yield stress of the fiber-reinforced composite material, are measured by both a rotational viscometer and capillary viscometer; however, it is very difficult for these meters to measure the rheology parameters at the low-shear-rate yield stress viscosity and at low temperatures. Instead of directly measuring these parameters of the fiber-reinforced molding material to be used in preparing the real composite article with a complex geometry, the present disclosure measures the fiber orientation distribution (core width, shell height, skin thickness) of the trial composite article having a simple geometry, and performs the CAE molding simulation capable of predicting the fiber orientation distribution, and then compares the measured fiber orientation distribution with the predicted fiber orientation distribution so as to obtain the rheology parameters of the fiber-reinforced molding material to be used to prepare the real composite article having a relatively complex geometry.

Conventionally, it is very difficult to measure the fiber orientation parameters (fiber-fiber interaction, fiber-matrix interaction, and orientation-to-random process of the fibers) of the fiber-reinforced composite material. In some embodiments, the present disclosure measures the fiber orientation distribution (core width, shell height, skin thickness) of the trial composite article having a simple geometry, and performs the CAE molding simulation capable of predicting the fiber orientation distribution, and then compares the measured fiber orientation distribution with the predicted fiber orientation distribution so as to obtain the fiber orientation parameters of the fiber-reinforced molding material.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for forming an injection-molded fiber-reinforced thermoplastic composite article using a molding machine controlled by a control system connected to the molding machine, comprising steps of:

forming a trial composite article made of a fiber-reinforced composite molding resin including a polymeric material having a plurality of fibers by injection molding using the molding machine under a trial molding condition, wherein the trial composite article has a trial fiber orientation distribution that indicates distribution of the fibers of the polymeric material in the trial composite article resulted from a flow of the fiber-reinforced composite molding resin during the injection molding, the injection molding being performed by injecting the fiber-reinforced composite molding resin into a metal mold through a molding nozzle by pressing the fiber-reinforced composite molding resin by a driving device;

analyzing the trail fiber orientation distribution of the trial composite article formed under the trial molding condition and measuring physical yield stress parameters on a shear viscosity of the trial molding article and physical fiber orientation parameters of the trial composite article from the trial fiber orientation distribution of the trial composite article by performing a first molding simulation executed on the control system;

by using the measured physical yield stress parameters on the shear viscosity of the trial composite article and the physical fiber orientation parameters of the trial composite article, generating a predicted fiber orientation distribution fitting with the trial fiber orientation distribution of the trial composite article;

determining a real molding condition for the molding machine for forming a real composite article of the fiber-reinforced composite molding resin from the measured physical yield stress parameters on the shear viscosity of the trial composite article and the predicted fiber orientation parameters by using a second molding simulation executed on the control system, so as to adjust a fiber orientation distribution of the read composite article; and controlling the mold machine by the control system to injection-mold the real composite article under the real molding condition using the fiber-reinforced composite molding resin, wherein the physical yield stress parameters on the shear viscosity of the fiber-reinforced composite molding resin is represented using an expression:

$$\eta(\dot{\gamma}, T, P) = \frac{\tau_y}{\dot{\gamma}} + \frac{\eta_0(T, P)}{1 + \left(\frac{\eta_0 \dot{\gamma}}{\tau^*}\right)^{1-n}}$$

$$\tau_y = \tau_{y0} \exp\left(\frac{E_Y}{RT}\right)$$

where $\eta$ represents a shear viscosity, $\dot{\gamma}$ represents a shear rate, T represents a molding temperature, n and $\tau^*$ represent constants, $\eta_0$ represents a zero-shear-rate viscosity, $\tau_{y0}$ represents a reference yield stress, $E_y$ represents an activation energy of yield flow, T represents an absolute temperature, and R represents a gas constant.

2. The method for forming an injection-molded fiber-reinforced thermoplastic composite article of claim 1, wherein the physical fiber orientation parameters include an orientation parameter representing a fiber-fiber interaction, a fiber-matrix interaction, or an orientation-to-random process of the fibers.

3. The method for forming an injection-molded fiber-reinforced thermoplastic composite article of claim 1, wherein the trial fiber orientation distribution has a trial core width, a trial shell height, and a trial skin thickness, and the step of generating a predicted fiber orientation distribution fitting with the trial fiber orientation distribution comprises:

generating a simulating fiber orientation distribution by performing the first molding simulation for the trial composite article of the fiber-reinforced composite molding resin injected into a mold by using simulating yield stress parameters and simulating fiber orientation parameters of the fiber-reinforced composite molding resin;

checking if a predicted core width of the simulating fiber orientation distribution fits with the trial core width, wherein if not affirmative, the simulating yield stress parameters are updated and the first molding simulation is repeated;

checking if a predicted shell height and a predicted skin thickness of the simulating fiber orientation distribution fit with the trial shell height and the trial skin thickness, wherein if not affirmative, the simulating fiber orientation parameters are updated and the first molding simulation is repeated; and if affirmative, the predicted fiber orientation distribution is set as the simulating fiber orientation distribution, and the physical yield stress parameters and physical fiber orientation parameters are set as the simulating yield stress parameters and simulating fiber orientation parameters of the fiber-reinforced composite molding resin.

4. The method for forming an injection-molded fiber-reinforced thermoplastic composite article of claim 3, wherein the trial core width of the trial composite article is correlated with the physical yield stress parameters, and the trial shell height and the trial skin thickness are correlated with the physical fiber orientation parameters.

5. The method for forming an injection-molded fiber-reinforced thermoplastic composite article of claim 1, wherein the first molding simulation is performed without assuming a steady state flow on simulating a molding phenomenon of the fiber-reinforced composite molding resin.

6. The method for forming an injection-molded fiber-reinforced thermoplastic composite article of claim 1, wherein the first molding simulation is performed without assuming a simple velocity gradient on simulating a molding phenomenon of the fiber-reinforced composite molding resin.

7. The method for forming an injection-molded fiber-reinforced thermoplastic composite article of claim 1, wherein the step of determining the real molding conditions for the molding machine takes into consideration the yield stress effect on the shear viscosity of the fiber-reinforced composite molding resin with respect to a shear rate lower than 10/second.

8. The method for forming an injection-molded fiber-reinforced thermoplastic composite article of claim 1, wherein the predicted fiber orientation distribution represents an orientation of the plurality of fibers along a flow direction of the fiber-reinforced composite molding resin.

* * * * *